US010687113B2

(12) United States Patent
Kegel et al.

(10) Patent No.: US 10,687,113 B2
(45) Date of Patent: Jun. 16, 2020

(54) RECOMMENDER CONTROL SYSTEM, APPARATUS, METHOD AND RELATED ASPECTS

(71) Applicant: BRITISH TELECOMMUNICATIONS public limited company, London (GB)

(72) Inventors: Ian Christopher Kegel, London (GB); Tamas Jambor, London (GB); Jun Wang, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 415 days.

(21) Appl. No.: 14/380,244

(22) PCT Filed: Feb. 27, 2013

(86) PCT No.: PCT/GB2013/000080
§ 371 (c)(1),
(2) Date: Aug. 21, 2014

(87) PCT Pub. No.: WO2013/128155
PCT Pub. Date: Sep. 6, 2013

(65) Prior Publication Data
US 2015/0020126 A1 Jan. 15, 2015

(30) Foreign Application Priority Data
Feb. 29, 2012 (EP) .................................... 12250044

(51) Int. Cl.
H04N 21/466 (2011.01)
H04N 21/258 (2011.01)
(Continued)

(52) U.S. Cl.
CPC ....... *H04N 21/4668* (2013.01); *G06F 16/435* (2019.01); *H04H 60/65* (2013.01);
(Continued)

(58) Field of Classification Search
CPC ......... H04N 21/41407; H04N 21/4383; H04N 21/458; H04N 21/835; H04N 21/24;
(Continued)

(56) References Cited

U.S. PATENT DOCUMENTS 6,177,931 B1 * 1/2001 Alexander ......... G06Q 30/0269
348/565
6,286,140 B1 9/2001 Ivanyi
(Continued)

FOREIGN PATENT DOCUMENTS

EP 1 248 463 10/2002
WO 99/45700 9/1999
(Continued)

OTHER PUBLICATIONS

European Patent Office Search Report for EP/12250044.0, dated Jul. 17, 2012.*
(Continued)

*Primary Examiner* — Hsiungfei Peng
(74) *Attorney, Agent, or Firm* — Nixon & Vanderhye P.C.

(57) ABSTRACT

User interaction data is heuristically processed to determine its usefulness to a remote recommender system. The data is ranked according it its likely ability to indicate a user preference towards a particular content item. The amount of data sent to the recommender system can then be limited to data records falling in a predetermined range of usefulness. A controller may be provided to determine what range is necessary so that the minimum amount of training data is provided to the recommender system to drive the recommender system's performance towards a set level.

17 Claims, 8 Drawing Sheets

(51) Int. Cl.
*H04N 21/482* (2011.01)
*H04N 21/472* (2011.01)
*H04N 21/6543* (2011.01)
*H04N 21/658* (2011.01)
*H04N 21/25* (2011.01)
*H04H 60/65* (2008.01)
*G06F 16/435* (2019.01)
*H04H 60/31* (2008.01)

(52) U.S. Cl.
CPC ..... *H04N 21/251* (2013.01); *H04N 21/25891* (2013.01); *H04N 21/4667* (2013.01); *H04N 21/47202* (2013.01); *H04N 21/4826* (2013.01); *H04N 21/6543* (2013.01); *H04N 21/6582* (2013.01); *H04H 60/31* (2013.01)

(58) Field of Classification Search
CPC ........... H04N 21/2407; H04N 21/2408; H04N 21/251; H04N 21/2541; H04N 21/2543; H04N 21/25816; H04N 21/266; H04N 21/2668; H04N 21/442; H04N 21/443; H04N 21/4431; H04N 21/4627; H04N 21/482; H04N 21/4825; H04N 21/6125; H04N 21/6143; H04N 21/6175; H04N 21/6405; H04N 21/6582; H04N 21/6583; H04N 21/812; H04N 21/854; H04N 21/2181; H04N 21/2187; H04N 21/2223; H04N 21/2405; H04N 21/258; H04N 21/25825; H04N 21/25866; H04N 21/25883; H04N 21/25891; H04N 21/2743; H04N 21/4126; H04N 21/4147; H04N 21/4263; H04N 19/00; H04N 19/107; H04N 19/154; H04N 19/61; H04N 19/115; H04N 19/126; H04N 19/149; H04N 19/15; H04N 19/162; H04N 19/176; H04N 19/19; H04N 19/192; H04N 19/196; H04N 19/30; H04N 19/51; H04N 19/60; H04N 7/163; H04N 7/17309; H04N 7/17318; H04N 13/0048; H04N 13/0059; H04N 13/0066; H04N 9/67; H04N 21/4335; H04N 21/43615; H04N 21/4405; H04N 21/4408; H04N 21/4532; H04N 21/454; H04N 21/466; H04N 21/4667; H04N 21/632; H04N 21/84; H04N 21/44222
USPC ............ 348/E7.061, E7.07; 725/121, 61, 86, 725/109, 111, 113, 14, 32, 38, 46, 63, 66, 725/67, 91
See application file for complete search history.

(56) References Cited

U.S. PATENT DOCUMENTS

| | | | |
|---|---|---|---|
| 8,843,965 B1* | 9/2014 | Kurapati | H04N 5/44543 725/37 |
| 2002/0083451 A1 | 6/2002 | Gill et al. | |
| 2003/0097657 A1* | 5/2003 | Zhou et al. | 725/46 |
| 2006/0075420 A1 | 4/2006 | Ludvig et al. | |
| 2006/0184968 A1* | 8/2006 | Clayton | H04N 7/17318 725/56 |
| 2008/0092159 A1 | 4/2008 | Dmitriev et al. | |
| 2009/0007198 A1* | 1/2009 | Lavender et al. | 725/91 |
| 2010/0125544 A1 | 5/2010 | Lee et al. | |
| 2011/0016198 A1* | 1/2011 | Shishido | G11B 27/105 709/219 |

FOREIGN PATENT DOCUMENTS

| | | | |
|---|---|---|---|
| WO | WO-9945700 A1 * | 9/1999 | ............ G06Q 30/02 |
| WO | 00/11869 | 3/2000 | |
| WO | WO-0011869 A1 * | 3/2000 | ............ H04H 60/31 |
| WO | 2004/047445 | 6/2004 | |
| WO | WO-2004047445 A1 * | 6/2004 | ............ H04N 7/16 |
| WO | 2005/022914 | 3/2005 | |
| WO | 2010/114857 | 10/2010 | |

OTHER PUBLICATIONS

International Preliminary Report on Patentability for PCT/GB2013/000080, dated Sep. 2, 2014.*
International Search Report for PCT/GB2013/000080, dated Apr. 4, 2013.

* cited by examiner

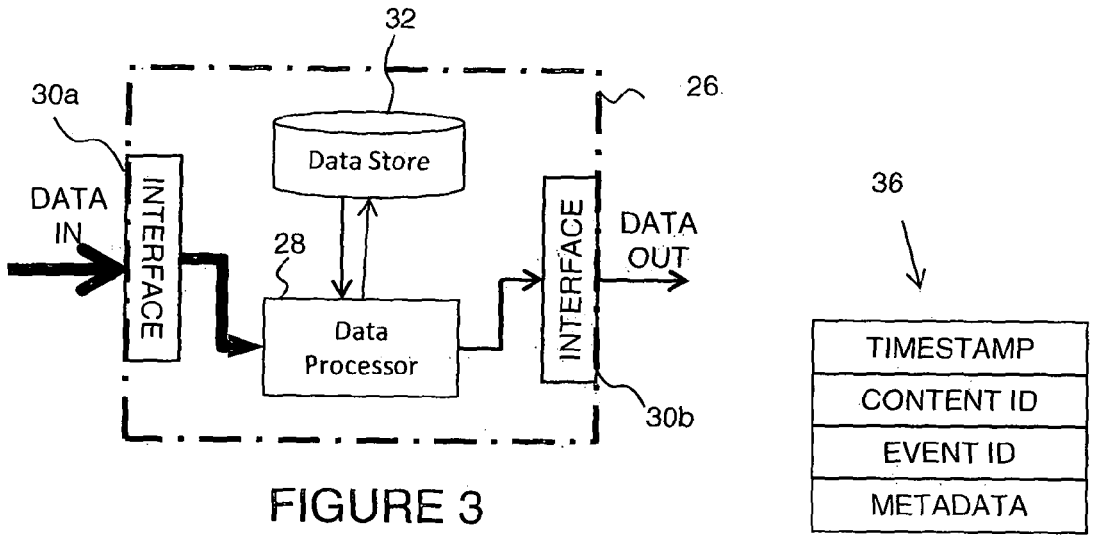
FIGURE 3
FIGURE 4
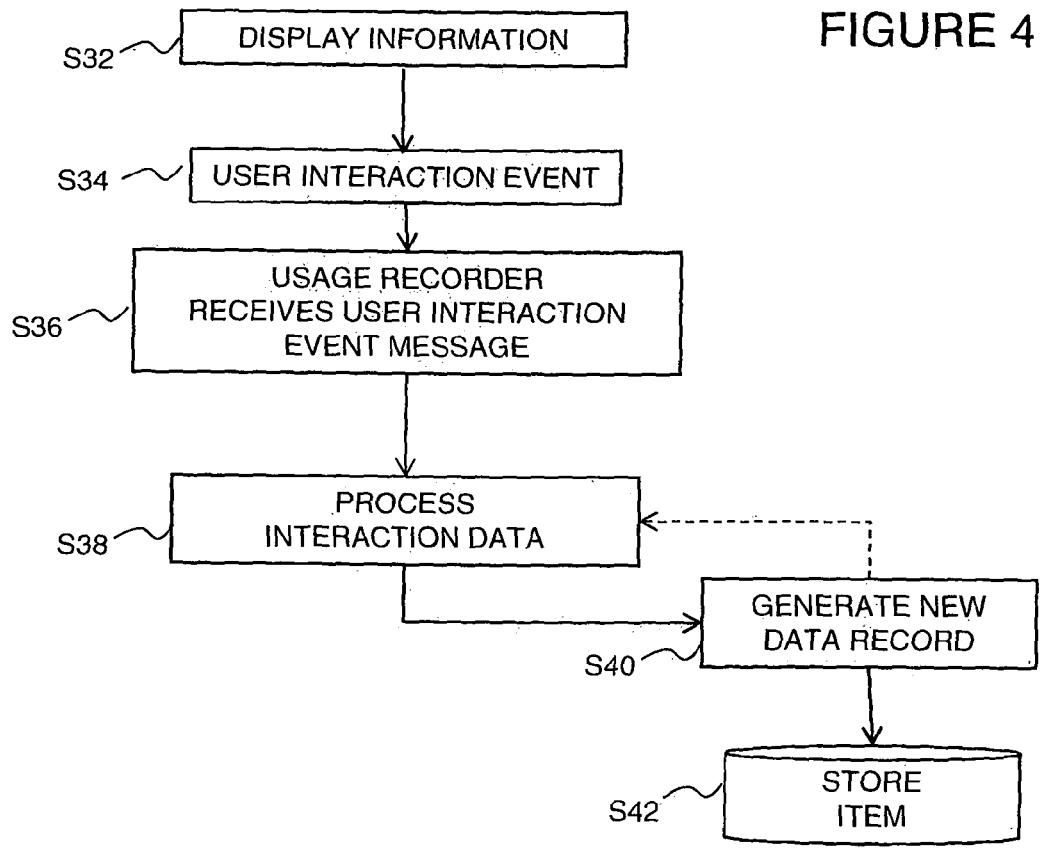
FIGURE 5

RECOMMENDER CONTROL SYSTEM, APPARATUS, METHOD AND RELATED ASPECTS

This application is the U.S. national phase of International Application No. PCT/GB2013/000080, filed 27 Feb. 2013, which designated the U.S. and claims priority to EP Application No. 12250044.0, filed 29 Feb. 2012, the entire contents of each of which are hereby incorporated by reference.

The present invention relates to a recommender control system, apparatus, method and related aspects. In particular, but not exclusively, to a control system for a recommender configured to provide accurate, up-to-date predictions of user preferences towards products within a large set, for example, within a Video on Demand catalogue.

BACKGROUND

Recommender systems are well-known in the art and provide personalized lists of recommended consumable items to users. The lists are generated on an individual basis and attempt to predict individual user interest towards the items listed, for example, purchasing the item and/or viewing it on a client device.

Known recommender systems provide either content-based recommendations in which a user is recommended items similar to the ones a user has preferred in the past; or collaborative filtering recommendations in which a user is recommended items that people with similar tastes and preferences have liked in the past, or adopt a hybrid approach which combines collaborative filtering and content-based methods. Recommendations are usually evaluated on the basis of a user probably liking/disliking an item, or on the basis of a potential rating that the user may assign to that item, or on a relative rating in which each user's potential liking is compared to the ranking of other items. An introduction to recommender systems can be found in Adomavicius, G., and Tuzhilin in "A. Towards the Next Generation of Recommender Systems: A Survey of the State-of-the-Art and Possible Extensions", IEEE TKDE (2005) which provides a comprehensive overview of the state of the art in recommender algorithms, the contents of which are hereby incorporated by reference.

Factors such as a) the continuous influx of new data about user behaviour, b) the number of new users that need recommendations, c) inconstancies in the amount of user behaviour data provided to the recommender and d) changes in the preferences of users over time, all contribute to a dynamically changing recommender system operating environment. Recommender systems which operate in such environments are preferably therefore retrained from time to time (or indeed quite regularly) with fresh training data which comprises information indicating what user's actual current preferences are so as to enable recommender systems in such dynamic environments to adapt to the changing conditions.

Not all consumable items however are consumed in a way which allows a preference to be expressed. For example, broadcast television channels usually do not provide viewers with an opportunity to indicate whether they liked a particular television programme or not. Even if an opportunity is given to express an opinion for an item, not all users may choose to provide an indication of their preference. The "degree" of preference may or may not be captured accurately overall as different users may indicate their preferences on scales of various degrees of conservatism, if a scale of 0 to 10, say, is provided rather than "like" or "dislike". In contrast, it is often possible to configure web-portals which provide Video-On-Demand (VoD) services to capture feedback from users who have downloaded and watched a video.

Moreover, providing data to re-train a recommender system from a huge number of users presents challenges in that it takes up system resources. For example, transferring user preference information from a large number of client devices takes up bandwidth within the communications network connecting the client devices to the recommender system. Moreover, training activities have a high computational cost for the recommender system. Thus the need to retrain needs to be balanced against the quality of recommendations being provided.

Recommender systems known in the art are limited in the way that the performance of the recommender is capable of being controlled externally by third parties. Parekh, S., Gandhi, N., Hellerstein, J., Tilbury, D., Jayram, T., and Bigus, J., describe the principles of control theory in their paper "Using Control Theory to Achieve Service Level Objectives In Performance Management", published in Real Time Systems (2002). More specifically, Zanardi, V., and Capra, L., in "Dynamic updating of online recommender systems via feed-forward controllers", published in the In Proc. of SEAMS (2011), describe using control theory to model the behaviour of software systems. They provide a set of analytical tools that can predict with high accuracy the behaviour of a real system in the context of monitoring system growth and to control whether the system needs to perform an update. Another publication addressing recommender control is by Meng, K., Wang, Y., Zhang, X., Xiao, X. C., and du Zhang, G., entitled "Control theory based rating recommendation for reputation systems. In Proc. of ICNSC (2006)".

In addition, it is known for set-top boxes to include functionality to store data about the usage of the set-top box (e.g. log data, use data, etc.)—see for example WO 00/11869; it is further known to perform pre-processing of that data to remove clearly irrelevant data (e.g. channel selection data that is associated with "channel hopping" is not useful for giving information about a user's viewing preferences—see US 2002/083451 as an example of this). Finally, it is also known for set-top boxes to perform some processing internally before responding to a request for information. In particular, WO 2004/047445 describes a set-tap box which has a user privacy policy which it consults before giving user preference data to a requesting server, and it selects (and/or modifies in some way—e.g. to anonymise) the information which it provides to the server based on the stored user privacy policy to ensure that the provided information does not contravene the privacy policy.

SUMMARY STATEMENTS OF INVENTION

The aspects and embodiments of the invention are as set out in the accompanying independent and dependent claims respectively which may be combined with each other in any manner apparent to one of ordinary skill in the art.

User interaction data is ranked according to the invention according to its likely usefulness in deriving user preference information. In some instances, the derivation of user preference information may be considered to provide a high level of confidence in a user "liking" the content item to which it relates. Some interactions may require consideration of other interaction data in order to determine if they represent a positive user preference. This provides considerable technical benefits over known functionalities of set-top boxes. In particular, it enables a very sensible response to be made for a request for data from a server, where the request specifies that a certain amount of usage data is required. Regardless of the manner in which the request is specified (e.g. requesting the "best" 20% of stored usage data, or requesting a certain volume of data (e.g. 10 Mbytes)) an optimum response can be given as a consequence of having ranked the usage data. Note that a finer level of granularity than just useful and not useful is required. Indeed, the ranking of the data should just be of useful data, useless data having been already removed from the system (e.g. using techniques such as described in US 2002/083451 discussed above). Clearly, even if not all data records are given an individual ranking, but rather they, are categorized as belonging to a category having a certain ranking, then the greater the number of different categories the better a request for a specified amount of data can be responded to. Thus the system will preferably have at least two different categories of usefulness of data and most preferably 5 or more. Note that a scoring system (e.g. attributing a score of say between 0 and 10 to each usage record) is equivalent to a categorization system (where there are 11 categories—or possibly 10 categories of useful data and 1 category of useless data, etc.).

By having set-top boxes rank their internal usage data, and by providing them with the additional functionality of selecting a specified amount of data in an intelligent manner (i.e. providing only the most useful data up to the specified amount), it enables an effective and efficient implementation of a system which dynamically modifies the amount of usage data used in a recommendation system, in order to use only an optimum amount. Optimum here may, for example, refer to an idea that there is a point at which increased amount of training data in the form of usage data does not materially increase the usefulness of recommendations provided by the system whilst costing more in terms of resources for collecting and processing that additional usage data, or it may even be that in some systems increased usage data beyond an, optimum amount actually (and surprisingly) worsens the quality of the recommendations provided by the system. In either case, the present invention helps to provide an efficient mechanism for obtaining only an optimum amount of such data (whatever optimum means in the system in question).

Note that although the preferred embodiments, which are described in detail below are particularly concerned with providing recommendations to users about items of audio-visual media (e.g. television programmes, films, sports broadcasts, etc.) via a set-top box enabling viewers to access certain media features in addition to those accessible via a normal television (e.g. video on demand services via an internet connection, etc.), the invention is capable of exploitation in any field of endeavour where recommendations can be provided to users based on usage information which a client device has access to and which can be requested from the client device by a remote server which processes the information in order to generate recommendations. As such the present application will use all of the following terms somewhat interchangeably throughout, namely a set-top box, a media delivery control device and a client-device, the last of which is intended to be the most generic and to cover embodiments which are not associated with media delivery (especially audio-visual media delivery). In general however, the present invention is not concerned with general shopping type recommendation systems in which the important user behaviour information is already available to a remote server and thus does not need to be collected from the user device. An example of an application to which the present invention might therefore have application could be in gaming applications where a user's off-line) playing experience is logged in some way by the user's gaming device (e.g. a pc) and is only later provided to a remote server which uses the information to generate game recommendations for the user based on his playing, behaviour, etc. Numerous other examples will occur to persons skilled in the art.

In practice, the likely usefulness of the user interaction data is likely to depend on the context of the interaction event(s) involved. Accordingly, heuristics may be used to assign a ranking to each category and/or each event's data record. By ranking each user interaction event according to its likely usefulness in indicating a user has liked (or disliked) the content item to which it relates, it is possible to assign a priority order to the set of user interaction data which each usage recorder logs in a given recommender cycle. A recommender cycle is the repeatable process by which the recommender system is trained. Recommendations are calculated, and then delivered to the user, following which the user may choose to interact with them. The duration of a recommender cycle is the time interval which elapses between recommendations being generated. In a typical system using a recommender control system according to the invention, a recommendation cycle repeats daily. At the end of each recommendation cycle only the most relevant or highest priority data records are sent to the recommender system to adjust its performance. The amount of data provided to the recommender system is limited in this way to comprise a number of the most relevant data records. The number of records sent is determined by the recommender input control system's training data processor as that which is just sufficient to train the recommendation system towards providing recommendations which comply with a predetermined reference performance level $\gamma_{REF}$.

A recommender control system according to the embodiments of the invention thus comprises a component located in the network and/or on client terminals which seeks to determine the degree of likely relevance of user interaction events for the purposes of providing a prediction of user preference and a component, which again may be located on the client terminal but normally located in the network, which seeks to control some aspect of the operation of the recommender system such that future performance of the recommender system will tend towards the desired recommender performance level. In theory any type of control over the recommender system could be used for this purpose, such as, for example the amount of processing cycles which it is allowed to consume when updating itself, etc. A more subtle manner of achieving such control is to vary some parameter used in the recommender system. For example, a popular type of recommender system at the present time uses latent semantic Models for collaborative filtering (see the well known paper "Semantic Models for Collaborative Filtering" by Thomas Hofmann available at the following url: http://comminfo.rutgers.edu/~muresan/ IR/Docs/Articles/toisHofmann2004.pdf) and a parameter which may be adjusted in such recommender systems is the number of latent variables (also known as latent or hidden classes, states or topics) used by the model (in which the fewer such variables used, the less processing that is required to train the recommender system but the less able it is to accurately model the user's preferences and so the lower the likely performance of the recommender system).

As mentioned above, although any aspect of the recommender system which can be controlled by the recommender control system can be used to control the performance opf the recommender system in order to drive its performance towards a specified desired performance level (a reference level), a particularly preferred aspect to use for this purpose is the amount of training data supplied to the recommender system. This is an aspect of the recommender system which is easily controlled by a device external to the recommender system itself (such that the recommender system itself can largely be treated as a black box, the internal functioning of which need not be known or modified in any way); additionally, by controlling the amount of training data supplied to the recommender system, it is possible to provide the minimum amount of such training data which is likely to result in a desired level of performance of the recommender system and thus to minimise the use of valuable resources such as network bandwidth, storage, etc. required to provide the training data to the recommender system. The amount of training data submitted may be increased or decreased by specifying that only data of a certain level of ranking (in terms of likeliness of indicating a user preference for some particular content) is submitted, and then increasing or lowering the ranking of data records and/or data categories assigned according to their likely usefulness to the recommender system which are sent to the recommendation system so that the recommendations are driven towards a desired level of accuracy in terms of predicting future user preferences. Alternatively, either an absolute amount of data could be directly specified, or a threshold rank could be altered (in a system where all records above the specified threshold rank are submitted but not any records having a ranking below the threshold rank, etc.). Or some combination of these approaches could be used. The desired performance level is not necessarily one which offers the best recommendations for all users, but may, for example, seek to result in a consistent level of recommendations for all users.

Preferably the items being recommended by the recommender system are media items such as films, songs, music videos, television programmes; broadcasts of sporting events, games (e.g. cloud hosted streamed video games), etc.

Other aspects of the present invention relate to computer programs for causing the methods of the present invention to be carried out when executed on a suitable device (e.g. a set-top box, or a server computer, etc.), and especially to media, most preferably non-transient media such as magnetic or optical storage disks (e.g. a hard drive or a CD or DVD), or volatile or non-volatile solid state memory devices (e.g. DRAM memory chips, solid-state drives, USB thumbdrives, etc.) carrying such programs.

BRIEF DESCRIPTION OF THE DRAWINGS

The preferred embodiments of the invention will now be described with reference to the accompanying drawings which are by way of example only and in which:

FIG. 3 shows schematically more detail of a usage recorder according to an embodiment of the invention;

FIG. 4 shows an event record generated by a usage recorder according to an embodiment of the invention;

FIG. 5 shows schematically how a usage recorder generates event records according to an embodiment of the invention;

The best mode of the invention as currently contemplated by the inventors will now be described with reference to the accompanying drawings. Those of ordinary skill in the art will appreciate that the accompanying drawings depict greatly simplified Figures and may omit features for which the necessity is apparent to implement the invention.

DETAILED DESCRIPTION OF PRESENT EXAMPLE EMBODIMENTS

Figure 1:
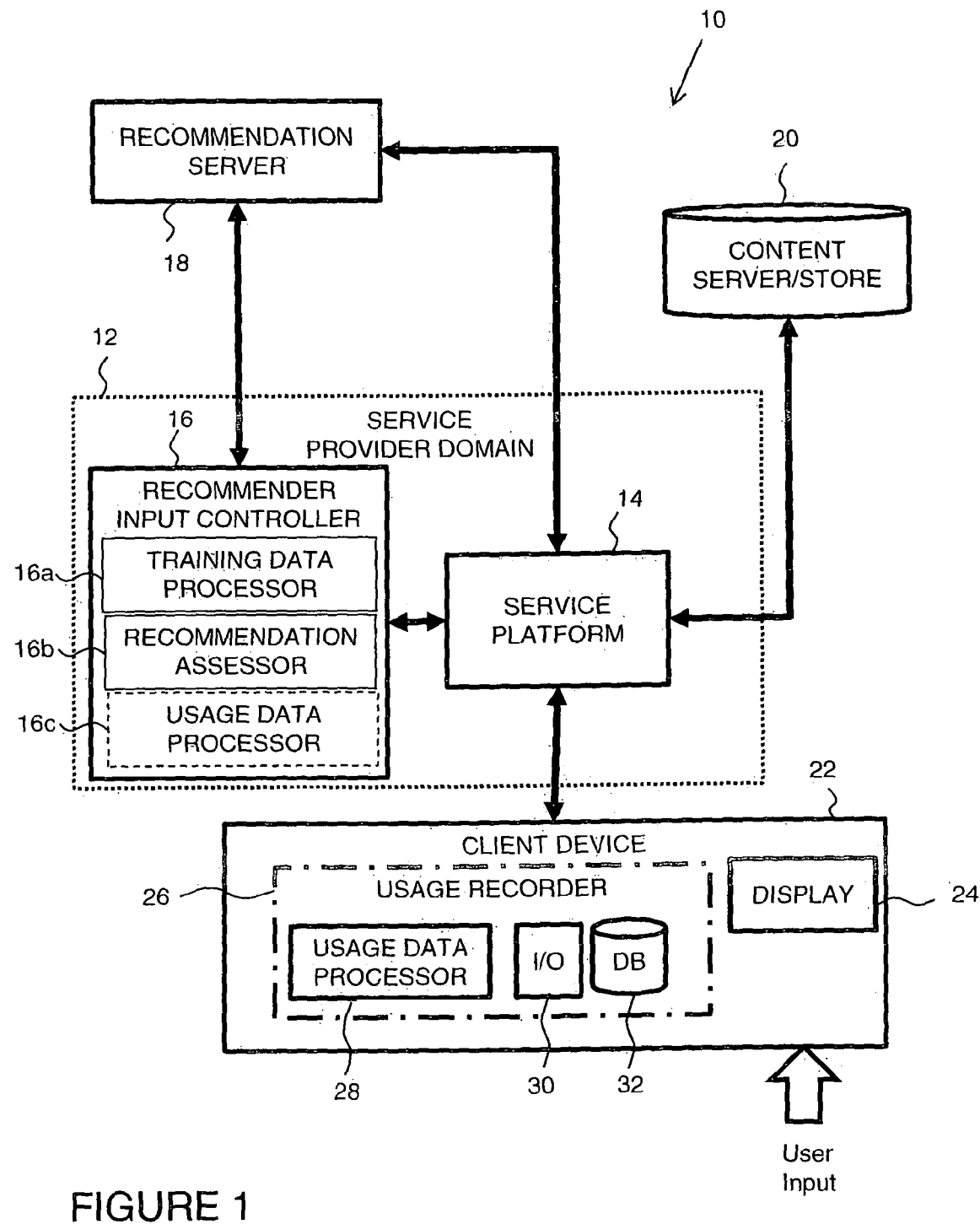
FIG. 1 shows schematically a recommender control system in a communications system according to an embodiment of the invention.

FIG. 1 of the accompanying drawings shows a recommender input control system 16 according to an embodiment of the invention implemented in a data communications system 10 comprising a number of interconnected components. Communications system 10 in this embodiment is arranged 10 enable a service provider to provide a content delivery service to a plurality of client devices 22 operated by end users (only one such client device being shown for simplicity).

Although only one client device is shown in FIG. 1, typically a large number and range of different types of client devices 22 are supported by a service platform 14 such as that shown. For example, any device which is capable of providing recommendation information to a display or which has an integral display, such as devices configured to provide electronic program guides (EPGs), for example, set top boxes, internet capable televisions, mobile communications devices, personal computers etc. As shown in FIG. 1, the client device 22 includes a display 24 for presenting information on recommendations provided by recommendation server 18, but if the display is not integrated, information is provided via a suitable data-interface to the display 24.

Data generated by user interaction with the client device 22 is monitored by a usage recorder 26 component running on client device 22. The usage recorder 26 runs on the operating system of the client device and uses the following components: a data processor 28, input/output data interface 30 for receiving usage data from other components of the client device 22 including components responsive to user input, e.g. the selection of a displayed recommendation item or content item. The usage recorder 26 records usage data as user interaction events and stores this data and any additional data it generates by processing user interaction data records in data storage means 32. In the embodiment shown in FIG. 1, the usage recorder 26 comprises a computer application which shares its physical resources with the client device 22. Alternatively, as would be apparent to anyone of ordinary skill in the art, the usage recorder may be integrated as hardware in client device 22, and as such may have its own independent resources. As shown, the usage recorder is configured to process recorded user interaction events to rank them in order of each event's likelihood of indicating a user preference towards the content item it relates to. Alternatively, or in addition, a process ranking user interaction records as training data may also be performed in the network as an adjunct process to determining the amount of training data to send to the recommender system 18.

As shown in FIG. 1, in the present embodiment, the amount of training data is determined by a network-located recommender input control 16. This is shown in the service provider's domain where it is configured to filter the data each client device 22 provides to re-train (or update) recommender system 18 according to what is required to adjust the recommender system's performance towards a predetermined reference level of performance $y_{REF}$. Alternatively, or in addition, an equivalent or similar filtering functionality can be provided on each client device, providing sufficient processing power is available, for example, as an adjunct process to the process ranking the user interaction records.

In FIG. 1, the recommender input controller 16 functionally includes at least two elements: a training data processor 16a which controls the amount of training data that is provided to the recommender system 18; and a recommendation assessment function 16b which assesses the performance of the recommender system 18 for each user—it does this by analysing previous recommendations made by the recommender system 18 and usage data (e.g. indicating whether a particular recommended media item has been viewed by a user subsequently to it have been recommended to the user) received from each client device. Additionally, in some embodiments (as indicated by the dotted line of 16c in the Figure), the recommender input controller 16 may additionally include a usage data processor 16c for processing usage data received from the client devices to convert it into a form suitable for use by the training data processor 16a (e.g. by forming likeness records from the usage data which indicate whether a user is considered to have liked or disliked (or neither liked nor disliked) a particular item and possibly also then ranking the records according to how useful they are considered to be for the purposes of training the recommender system 18). Note that the usage data processing function could be performed within each client device instead of at the recommender input controller 16 (see the usage data processor function 28 in FIG. 1). Alternatively there could be some client devices including the function and some which do not. Also, instead of all such processing being done either at the recommender input controller 16 or at a client device 22, it could be that some processing is performed at the client device (e.g. to generate likeness records) and some is done at the recommender input controller 16 (e.g. to rank the likeness records in terms of their likely usefulness to the recommender system 18).

Service platform 14 is provided in the same service provider control domain 12 as the recommender input controller 16. In this embodiment, Service platform 14 is arranged to receive requests for service from client devices 22 and to provide information which the client devices can display. It may also function as a head end for broadcast channels and can forward requests for content to content server 20 for video on demand content. Service platform 14 receives data from client devices 22 and determines the timing of how this data is forwarded to the recommender input controller 16 in one embodiment of the invention. Alternatively, client devices 22 may individually forward data directly to the recommender system if they have the appropriate processing to implement the adjunct data filtering functionality which controls the amount of ranked training data provided based on feedback relating to the performance of previous recommendations and the desired recommendation performance level $y_{REF}$.

In practice, depending on the number of users accessing the service and/or their usage, and the type of preference information available, the amount of useful user interaction event data available in each recommendation cycle between recommendations varies, dynamically during the operation of the recommendation system 18. To ensure that the optimum balance is obtained in terms of the amount of training data provided to adjust the recommender's performance for each user, the recommender input controller 16 shown in FIG. 1 uses a training data input control processing function shown as training data processor 16a which is configured as a closed-loop controller. Feedback is provided on the performance of previous recommendations for each respective user, from the recommendation assessor 16b, in order to drive the recommender system 18 to provide recommendations for each respective user which follows a desired reference performance level $y_{REF}$. The recommender system's performance is controlled in this way to conform as closely as possible to a predetermined reference value $y_{REF}$ regardless of any external disturbances which change dynamics of the recommendation system's operation, for example, changes in the amount of preference data provided per user.

The recommender input controller 16 shown in FIG. 1 accordingly provides a means for a service provider (or any other party able to provide $y_{REF}$) using a recommendation service to set a preferred performance level for the recommendations generated for the service being provided. The type and amount of training data provided to the recommender system 18 is controlled to drive the performance of the recommender system 18 towards a desired performance value, $y_{REF}$, or to be maintained within a desired performance range. $y_{REF}$ may not be the optimum level achievable, but may be a level available to the majority (if not all) of the users of the services being offered.

The performance of recommendations is determined using the user interaction data in the system shown in FIG. 1. Typically user interaction data related to items is recorded by the usage recorder 26 in a previous recommendation cycle i−1. This is usually a large amount of data which is preferably limited before being provided to the recommender system 18. If the data is filtered by the recommender input controller 16 in a current cycle i, it is then available for use by the recommender system 18 in generating recommendations in the next cycle i+1. Note that in the present embodiment, an estimate of the performance of recommendations (which is basically a somewhat subjective issue) is obtained indirectly from the user interaction data as is discussed in greater detail below. However, in alternative embodiments, the performance of recommendations could be obtained more directly by simply asking users to rate the recommendations they have received—this would simplify the process of estimating the performance of a recommendation system considerably but would place a possibly unwanted burden on the user. An ideal solution probably includes elements of mining user interaction data to obtain inferences from indirect user data as to the performance of recommendations together with a small amount of direct performance feedback data supplied explicitly by the user.

The way the recommender input controller 16 filters training data is known to impact the performance of the recommender system 18. In one embodiment (see FIG. 9, described in more detail hereinbelow), the recommender input controller is internally configured to model the dynamic variation of the recommendation performance as a damped harmonic oscillator (described in more detail herein below). As such, the recommender input controller 16a adjusts the amount of training data it provides to drive the recommender system 18 in cycle i to provide recommendations in cycle i+1 which have a lower performance (e.g. they are less accurate recommendations—see below for a fuller discussion of recommender system performance measurement) if in the i−1 cycle the recommendations for that user were determined to be above a reference accuracy/performance value $y_{REF}$), and to drive the recommendations provided towards an improved performance level in cycle i+1 if in cycle i−1 the recommendations were less accurate than specified by the reference accuracy value, ($y_{REF}$) (i.e. if the measured recommender system performance is below the reference performance level $y_{ref}$).

More information on the types of performance metric which may be measured for recommender systems can be found in "Evaluating Collaborative Filtering Recommender Systems", by JONATHAN L. HERLOCKER, Oregon State University, and, JOSEPH A. KONSTAN, LOREN G. TERVEEN, and JOHN T. RIEDL of the University of Minnesota, ACM Transactions on Information Systems, Vol. 22, No. 1, January 2004, Pages 5-53, the contents of which are hereby incorporated by reference. The term performance level or metric is used herein to represent a measurable performance characteristic such as, for example, the percentage of items recommended being interacted with in some way by the user, e.g. 1 out of 100 recommendations was selected by a user. The performance metric is determined, in the present embodiment, by the recommendation assessor 16b of the recommender input controller 16; however in alternate embodiments this function could be performed by the service platform 14 (if this platform is able to assess the performance of the recommendations). Whichever platform has measured the performance metric (recommender input controller 16 or service platform 14) then provides the measured performance metric to the training data processor 16a of the recommender input controller 16 so that it can process this data by comparing it with the reference value and selecting an appropriate amount of training data to transmit to the recommender.

Note that in the present embodiment the same usage data is being used for two distinct purposes: to evaluate a measured performance metric and to generate training data for sending to the recommender system 18.

Other uses of the recommender input controller 16 include instead or additionally stabilising the recommender CPU activity towards a desired processor load value, for example, to minimise the processor load in each recommender cycle whilst maintaining a desired-performance level. Also, the performance level may be optimised instead of stabilised for all users, albeit (possibly) for a given acceptable (maximum) amount of overall training data to be provided to the recommender system (i.e. the system would then be attempting to optimise the way in which the total maximum amount of usage data for a population of users is distributed so as to obtain the overall best recommender performance over the population as a whole given some overall limits on resources available to the recommender system, such resources including, for example, bandwidth over which usage data can be sent, storage facilities for storing the data, processing power (e.g. processor cycles available to the recommender system), etc.

The performance metric(s) may be evaluated in a number of locations in the system—for example, as mentioned it can be performed in the recommender input controller or at the service platform 14. Alternatively; performance could be evaluated by the recommender system 18 itself or at the client device 22 (or some other device connected thereto and local to the client device—e.g. a user's PC, or a home hub device, etc.).

As mentioned hereinabove; in FIG. 1, a single platform 16 is illustrated as possibly providing both batch usage/heuristic data processing (to generate (possibly ranked) likeness records) and providing the functionality to determine the amount of training data to be provided to the recommender system 18. Alternatively, however, where both functions are to be performed centrally—i.e. within the network rather than on client devices—the two control functions could nonetheless be implemented on separate central platforms.

Although the embodiment of the invention shown in FIG. 1 relates to a recommender system 18 which provides recommendations for a content distribution service, the recommender system is not limited to recommendations to just content items as would be apparent to anyone of ordinary skill in the art.

Figure 2:
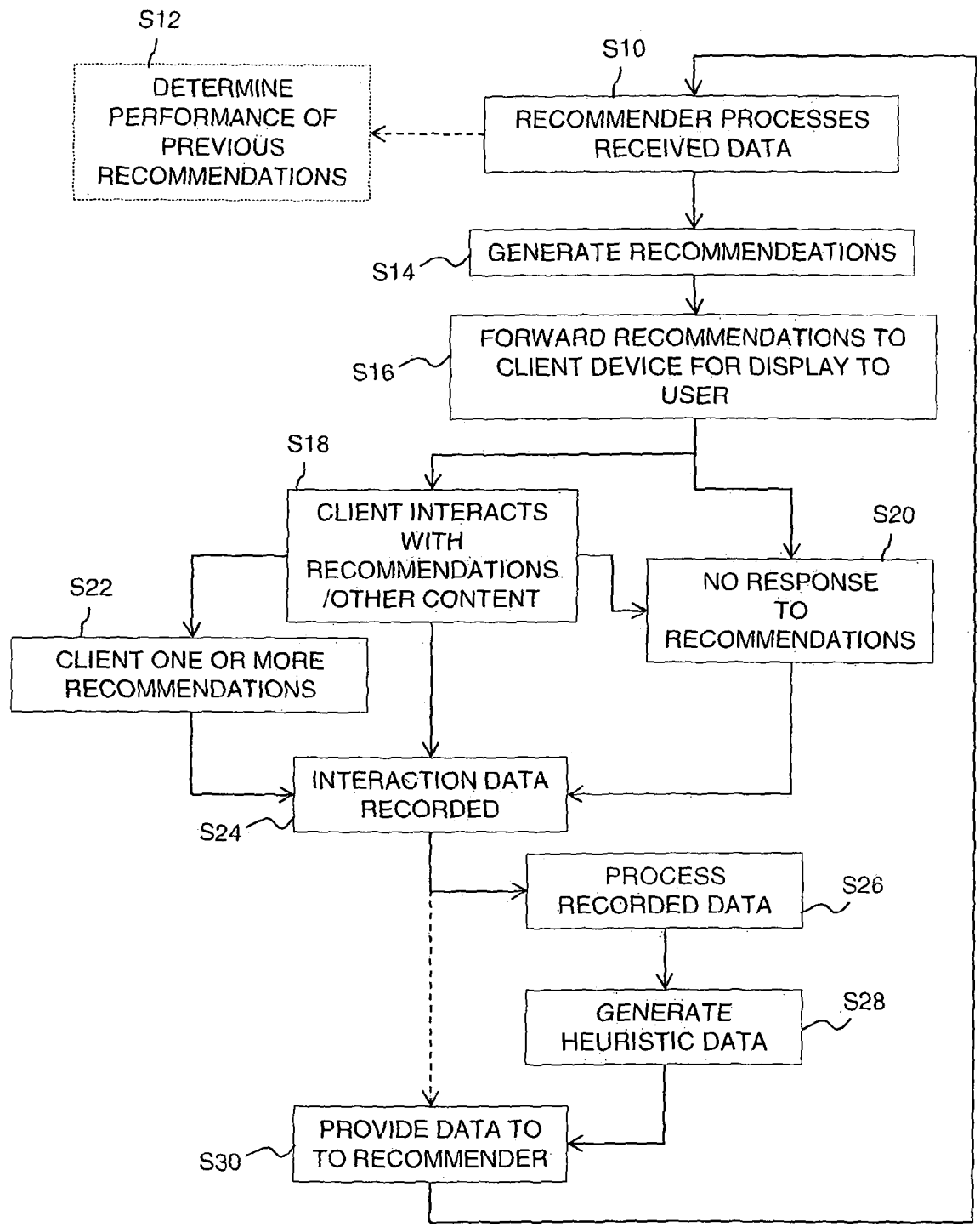
FIG. 2 shows schematically how a recommender system operates according to an embodiment of the invention.

FIG. 2 provides an overview of how the recommender system 18 shown in FIG. 1 provides recommendations to client devices 22 according to an embodiment of the invention. Although FIG. 2 may omit to show some essential steps which would be apparent as necessary to anyone of ordinary skill in the art for the sake of clarity, the inclusion of all necessary steps to implement the invention is implicit.

As shown in FIG. 1, the recommender server 18 receives data (step S10) which is representative of the response of a user of the relevant client device 22 to which recommendations were previously provided. As shown in FIG. 2, the data is processed for two purposes by the recommender. Firstly, to assess the performance of the previous recommendations (step S12). For example, how good were the recommendations for that particular user, did the user select any recommended items, what actions did the user perform responsive to the recommendations made, did the user provide any feedback about the recommendations, etc, etc. This step may, however, be performed by the service platform 14 in other embodiments of the invention.

Secondly, based on the usage recorded on the client device 22, the recommender system 18 is "trained" (or in fact it has it's training updated to reflect the new information available to it). New recommendations are generated (step S14) based on the training state of the recommender system (which is preferably as up-to-date as possible) and based on a database of possible items to be recommended to the user (e.g. based on a selection of items to be broadcast and described in an EPG or based on an updated database of movies available for rental (e.g. by downloading or streaming—i.e. Video on Demand) which are then provided to the client device 22 (step S16). In the present embodiment, whenever a user interacts (or perhaps fails to interact) with information provided on display 24 (step S18), in any one of a number of predefined manners, an interaction event is generated (step S24). For example, interaction events associated with a user opting to consume a recommended item may be recorded (step S22) and the usage recorder 26 may also record when a recommendation is displayed without any response from the user (step S20).

As mentioned above, user interaction event data is acquired (step S24) by the usage recorder 26 when a user interacts with information provided on display 24. User interactions may comprise events such as the user fast-forwarding through content, selecting content to view, storing content, pausing content, resuming content, recommending content to other users, deleting content. As such, a very large amount of data maybe generated from user interaction events. Some events, such as pressing pause, may not be of much relevance in the context of indicating a user's preference for the item being viewed. Other events, such as storing the content item, particularly if afterwards the user views it, are likely to be a more reliable indication of user preference. The client device 22 is configured to generate interaction event data for a range of user interactions and to push each interaction event to the usage recorder 26 for monitoring purposes.

Figure 7A:
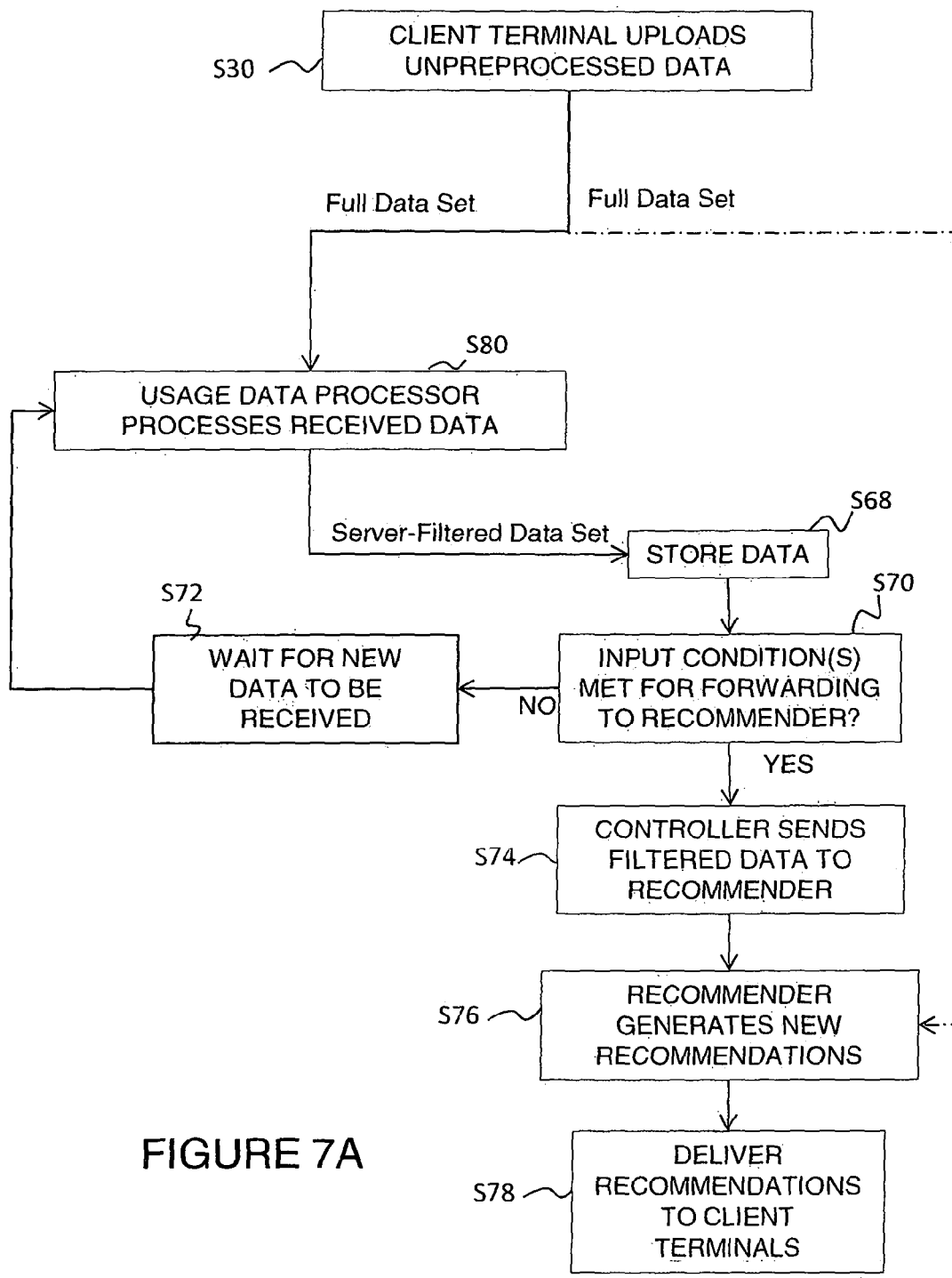
FIGS. 7A and 7B show schematically how performance data is generated and forwarded to the recommender system as training data according to embodiments of the invention.

The usage recorder 26 in one embodiment of the invention does not further process the data it accumulates in each recommendation cycle, but provides all recorded data from step S24 to the recommender input controller 16 (step S30 in FIG. 7A). However, in another embodiment of the invention, the client device 22 processes the stored interaction data (step S26 in FIG. 7B) to generate likeness records (specifying an indication of a user preference towards a particular item) and to categorize and/or rank the relevance of each item or record of usage data or each generated likeness record i.e. to determine the (possibly relative) estimated usefulness of such an item or record for training the recommender system 18 as to that user's preferences.

This ranking is achieved, in the present embodiment, by using a heuristic processing operation. The heuristic processing may operate simply to categorize data records into groups, each group being associated with a level of usefulness in determining if a user likes or dislikes a content item in addition or instead, heuristic processing is performed on user interaction data records to derive an explicit indication of a user preference from the interaction events. For example, several individual user interaction data records relating to a user storing and viewing a content item may generate a heuristic user preference data record (or likeness record) indicating the user likes the content item after they have viewed it a number of times, but be used to indicate a user dislikes the content item if they delete it without viewing it or after having viewed only a small portion of it. This kind of inferred likeness data based on usage data is usually less reliable than a direct user rating of an item but is useful to the recommender system 18 despite the lower degree of confidence as more interaction or usage data is usually available than would be the case if feedback to the recommender system 18 was provided only on content items for which a user has indicated an explicit preference. The individual user interaction event records or heuristically derived user likeness records for a particular content item are also, in the present embodiment, processed to assign each record to a ranked category in terms of its likelihood of providing an indication of a user preference (such as a "liking" or "dislike" or liking value range) to the content item to which the record relates when the record is received by the recommendation system 18. This ranking may additionally take into account the perceived general popularity of the respective item; generally speaking information about a user's liking of a less popular item will be more useful in the training of a recommender than information about a user's liking of a popular item for reasons well known to those skilled in the art of recommender systems.

A content service provider typically provides information and recommendations on its service offerings to a large number of client devices 22 associated with its service subscribers. The services offered typically comprise both content downloaded as a file as well as content streamed point to point or broadcast or multicast over a suitable network. Accordingly a content item can be delivered from data store 14 to users by the service platform 14 or via broadcast channels. In some embodiments, users are, capable of providing preference feedback on VoD content but not necessarily capable of providing direct preference feedback on broadcast material. In other embodiments, no direct feedback is supported at all for either broadcast, recorded broadcast or VoD content. The broadcast and VoD content is displayed to the user via a suitable device, for example, a television or computer, which may have internal hardware and/or software components capable of providing an electronic programme guide (EPG) and/or a web-portal to purchase VoD items, or which may use a separate set-top box to receive such information. To improve the performance of the recommender for VoD items, even when a user has not viewed any VoD content in one, or more, or any previous recommendation cycles, the client device records the user interactions with the EPG and broadcast channels. In practice, the range of user interactions which can be used to deduce a user preference for a content item is quite large, as the table below indicates:

TABLE 1

Examples of User Interaction Events

| User Interaction | VOD | Recorded Broadcast | Broadcast | Estimated Frequency |
|---|---|---|---|---|
| Select Channel → Watch item | | | ● | >daily |
| Favourite Channel | | | ● | monthly |
| Record Item | | | ● | daily |
| Record series | | | ● | monthly |
| Set Reminder | | | ● | daily |
| Pause Live TV | | | | |
| Delete Recorded Item | | ● | | daily |
| Lock/protect Item | | ● | | weekly |
| Purchase Item | ● | | | weekly |
| Friend's Purchases | ● | | | weekly |
| Play Item (10%, 50%, 80%) | ● | ● | | daily |
| View Contributor in UI | ● | ● | ● | >daily |
| View Item in UI | ● | ● | ● | >daily |
| Favourite Item | ● | ● | ● | weekly |
| Favourite Contributor | ● | ● | ● | weekly |
| Add Item to Playlist | ● | ● | ● | weekly |
| Remove Item from Playlist | ● | ● | ● | weekly |
| Use Item as Playlist Seed | ● | ● | ● | weekly |
| Share Item | ● | ● | ● | monthly |
| Share Contributor | ● | ● | ● | monthly |
| Like Item | ● | ● | ● | weekly |
| Like Contributor | ● | ● | ● | weekly |
| Dislike Item | ● | ● | ● | weekly |
| Dislike Contributor | ● | ● | ● | weekly |
| Friend's Plays | ● | ● | ● | weekly |
| Friend's Likes | ● | ● | ● | weekly |
| Friend's Dislikes | ● | ● | ● | weekly |
| Search for Item/Contributor | ● | ● | ● | weekly |
| Volume level & mute | ● | ● | ● | >daily |
| Pause | ● | ● | ● | daily |

The final column in Table 1 provides a rough estimate of the probable frequency of the specific user interaction event occurring for a typical user of the service, which provides an idea of the number of events which might be generated in this event category.

Some of the user interaction events shown in Table 1 will require additional processing to identify the content item they relate to, for example, whenever a select channel/watch product user interaction event is captured for broadcast content, the specific content item being watched is identified using additional processing which determines the content item identifier from a broadcast electronic programme guide (EPG). Some user interaction events may also be processed using pattern recognition techniques on the records in data store 32 to determine if they fit an activity profile considered to be irrelevant from the perspective of user preference, such as those events resulting from programme search strategies like scanning, flipping, grazing, zapping and channel hopping or if they fit an activity profile indicating a likely preference by the user for the content they relate to. Typically the original user interaction events are deleted from data store 32 and not provided to recommender system 18 as they are replaced with a collective heuristic data record indicating the likely relevance or if irrelevant, simply discarded. Other patterns of behaviour are known and some examples can be found in "Dynamics of Individual Television Viewing Behavior: Models, Empirical Evidence, and a Research Program", by Anke Wonneberger, Klaus Schoenbach, and Lex van Meurs, Amsterdam School of Communications Research (ASCoR), University of Amsterdam, 2008; for example, on page 14 of the paper some exemplary patterns are given originally from another author.

The above events are mostly active in that the user has actively triggered the event record. However, the term user interaction event is not limited to such events as passive events which are associable indirectly with a user interaction may also be logged by the usage recorder 26. For example, the termination of a watched program may not be accompanied by a user switching off, but this would normally be logged by the usage recorder 26. Also, within a content item, as it is played and/or displayed, tagged frames associated with the played/displayed content may trigger the generation of a user interaction event having meta-data associated with the played/displayed content. Similarly, it is possible for a user to interact with a second display (not shown in the drawings) associated with a first display showing a content item, and the device supporting the second display may also be configured to push user interaction event messages towards the usage recorder associated with the first display 24.

FIG. 3 shows schematically the functional components of usage recorder 26 according to an embodiment of the invention. As shown in FIG. 3, usage recorder 26 comprises input and output data (I/O) interfaces 30a, 30b respectively, a data processing means 28 and data store 32. Usage recorder 26 receives information comprising user interaction events via I/O interface 30a. The received information comprises data messages generated by other components of client device 22 reporting user interaction events of the type shown in Table 1. Data processing means 28 processes the data received to extract the information required to generate user interaction event records, for example, of the type shown in FIG. 4 and described in more detail herein below. As, mentioned above, in some instances, additional processing of the user interaction event data is necessary in order to associate the information provided by the user interaction event message with a content item. For example, if the event comprises the user watching a broadcast TV channel, other electronic sources of information such as the EPG provided on the client device 22 is consulted to determine the content item. The resulting user interaction event records, also referred to herein as usage data records, are then stored in data storage means 32 until the end of each respective recommender cycle at which point some or all of the stored data records are forwarded directly or indirectly to the recommender system 18.

FIG. 4 shows an exemplary data structure for a data record of a user interaction event however other data fields may be provided, and the metadata field shown may have substructure. As shown in FIG. 4, a data record according to one embodiment of the invention comprises timestamp information indicating the time of the event, a content identifier, an event type identifier, and optionally any metadata also provided with the interaction data. Each usage data record generated for a user interaction event in a more specific embodiment such as that required for content delivery service recommendations provides the following context information for each action logged: Device ID (for the client device); TimeStamp (e.g. Date/Time of logging the action); a User ID (for the service subscriber); Location (of the client device); content item type; and service type. Examples of content item types include content items distributed via broadcast channels, multi-cast/box-office, VoD (including replayed items previously broadcast). Examples of service type include VoD services, broadcast services, as well as recorded broadcast and VoD services. Examples of metadata include, in one embodiment of the invention, a value or ranking which provides an indication of the relevance of the event category for the purposes of predicting a user preference, together with a liking value indicate the extent to which it is believed that the user either liked or disliked or was indifferent towards the item identified by the content ID.

FIG. 5 shows the key steps performed on the client device 22 prior to providing information to recommender system 18 according to an embodiment of the invention. Firstly, a user interacts with the information displayed on the display 24 of client device 22 (step S34) which triggers sending a user interaction event message to the usage recorder 26 (step S36).

As previously mentioned, the client device 22, in the present embodiment, is configured to generate a usage event message whenever the user interaction comprises a recordable event. Examples of recordable events will depend on the context of client device 22 and its user interface capabilities. For example, in embodiments where client device 22 is configured to provide electronic programme information (for example, if client device 22 comprises a set-top-box or other adjunct device to a television or like apparatus), then when the user interacts with the displayed EPG or otherwise selects a content item to view, store, rewind, fast forward, resume, or recommends it, etc., or causes any other of the events listed in Table 1 to be performed for a content item such as video, audio, electronic game, book, computer software etc (this is not an exhaustive list as would be apparent to anyone of ordinary skill in the art) the user interaction is logged by usage recorder 26.

The usage recorder 26 processes the received user interaction event messages (step S38) and logs the interaction in, data store 32 (step S40). The amount of processing performed by the client device 22 at step S38 varies between different embodiments of the present invention from minimal processing to simply generate discrete log records of all events which the device is configured to record (including at least a time-stamp and an indication of the event which has occurred) at one extreme, to full heuristic processing in order to generate likeness records (and indeed in some embodiments, even to make a selection of which of these likeness records should be sent directly to a recommender system for training of the recommender system). In the present embodiment, heuristic processing is performed on the event messages (and prestored data records as indicated by dashed feedback line between step S40 and step S38) in a manner as described below. As discussed below, the process of generating heuristically processed likeness records may be an iterative one in which initial data usage records are firstly stored in data store 32 and these are then processed subsequently in order to generate likeness records (perhaps once sufficient time has passed to be able to be reasonably confident that all user interaction events which might be appropriate for capturing in a single likeness record have been captured by the system. At such a point in the processing therefore, an initially stored interaction event message held in data store 32 may comprise log data records which have not been heuristically processed to assess their potential for indicating user preference for the content item to which they relate.

As shown in FIG. 5, usage recorder 26 is configured, in the present embodiment, to perform additional processing on the logged data records (returning to step S38 as shown by the dashed line) for some or all user interaction events, for example, using pattern recognition techniques such as those well known in the art, it is possible to determine from groups of two or more event records if each record in the group is likely to be relevant or not in terms of expressing a user preference towards a content item. In this way, it is possible to discard data records which relate to irrelevant events, such as if the timestamps for several different "watch broadcast channel" events are very close to each other, it is likely that the user has been channel hopping and so the associated data records can be deleted or assigned a very low relevance ranking score.

Heuristic processing is additionally or instead run on the stored data records to assess how relevant they are in terms of their ability to provide the recommender system 18 with an indication of a user preference towards the content item to which they relate. Once a data record has had such an indication of the users preference for a particular content item added to it, it becomes a "likeness'record" which is more directly useful for subsequent processing by an intermediate processing device such as the recommender input controller, or indeed by the recommender 18 itself. More relevant data records will normally be assigned higher relevance rankings, although a reverse ranking scheme is equally viable. This heuristic processing is used to determine what data in each recommender cycle, i, the client device 22 should provide to the recommender system 18. For example, it may be that the usage recorder on one client device provides only highly scoring data to the recommender system 18 (either directly or indirectly) whereas in other embodiments, all client devices 22 provide all the data held in data store 32 at the end of each recommender cycle i.

The heuristic data records generated by the client device 22 (step 40) are stored locally in data storage means 32 (step 42) before being forwarded to the recommender system 18 via the recommender input controller 16 provided by the service provider and via the service platform 14 as shown FIG. 1. Alternatively, it is possible to forward data directly to the recommender system 18 where the necessary functionality to limit the amount of training data is provided on each client device 22 (or where it is provided at the recommender system itself).

Note that in the present embodiment, the recommender input controller 16 is performing two separate functions based on the received usage data/heuristic data records/likeness records, namely calculating a performance metric and selecting a portion of the data to be input to the recommender system as training data. Some or all of this functionality could however be distributed to the client devices 22. For example each client device could assess the performance of the recommender system by comparing the recommended items with the user actions indicating some interaction with the user of the recommended items and then provide this to the recommender input controller 16; similarly, each client device could send a selected portion of the usage data to the recommender system directly for training purposes, the selected portion either being decided by itself (in an entirely distributed system) or else as indicated by a central device such as the recommender input controller 16. Alternatively, each client device could perform a first filtering such as to identify usage data records which satisfy some minimum level of potential usefulness (either for use in generating a performance metric or for training purposes) and then only send the data which gets past this first internal filter to the recommender input controller 16. Some points to bear in mind when designing a system are that if a central recommender input controller already has the data which is to be sent to the recommender system for training purposes, there is some logic in it sending the data on to the recommender system rather than getting the individual client devices to send this info directly to the recommender system (and this would therefore tend to indicate that either the recommender input control functionality should be either completely distributed or completely centralized); also there is a possibility, when using a central device such as a central recommender input controller; to obtain better determinations of a recommender systems performance metric by comparing the data from one client device with that from others (for example, a film which is extremely popular (as indicated based on the results of a large number of other users' data) should not positively skew the performance metric for the recommender system which successfully recommended it to a single user so much as an unpopular film successfully recommended by the system)—and this would tend to suggest that such functionality should be centralized—as in the present embodiment.

If the heuristic operations run on the user interaction data records categorize the data records in terms of their usefulness to the recommender, the amount of data sent over a communications network to the recommender input data controller 16 and/or recommender system 18 is quite easily limited to events which meet a predetermined set of criteria. For example, heuristic data records which fall in a category which explicitly provides indications a viewer liked one or more particular content items only may be provided. Alternatively, if heuristic data records are ranked from a level from 0 (not useful) to 10 (very useful), it is possible to only send the heuristic data records which have a usefulness ranking of 5 or above, and the remaining heuristic data may be discarded.

Accordingly if in one embodiment, heuristics are run on the original user interaction event records to categorize the records into a relative order of likely usefulness in terms of indicating a user preference, meta-data is generated and stored in a heuristically processed data record which indicates in that data record its assigned category ranking value in absolute terms. However, alternatively, a relative usefulness ranking can be generated in each recommender cycle based on the events which have been logged in that particular recommender cycle. This is useful where some users do not generate a sufficient number of more useful category user interaction events in a given cycle. Only data records above a minimum absolute or relative level of usefulness are sent to the recommender system 18 each cycle. Moreover, in some instances, several user interaction event records are processed and generate a single heuristic data record. In this way, some heuristic data records are able to replace more than one individual interaction data record in data store 32.

As mentioned above, the heuristic operations on the user generated interaction data stored in data store 32 may be run dynamically as patterns in the stored data records are recognised by the usage recorder 26. Alternatively, or in addition, the heuristic processing is run responsive to a triggering event, such as receiving a request from the recommender system for additional input for new recommendations and/or an amount of time elapsing to indicate that the end of a recommender cycle has been reached.

In any event, once the data has been processed to assign the data ranking values (relative or absolute) it is possible to order the data in usefulness and the client device may then respond intelligently to requests for a certain amount of data, whether those requests are specified in absolute terms—e.g. provide (the most relevant) X bytes of data; or the most relevant N records, etc. or provide all data with a ranking of 6 out of 10 usefulness or more, or provide the most useful X percent (e.g. top 50%) of the data you have collected for the cycle in question, etc.

Figure 6:
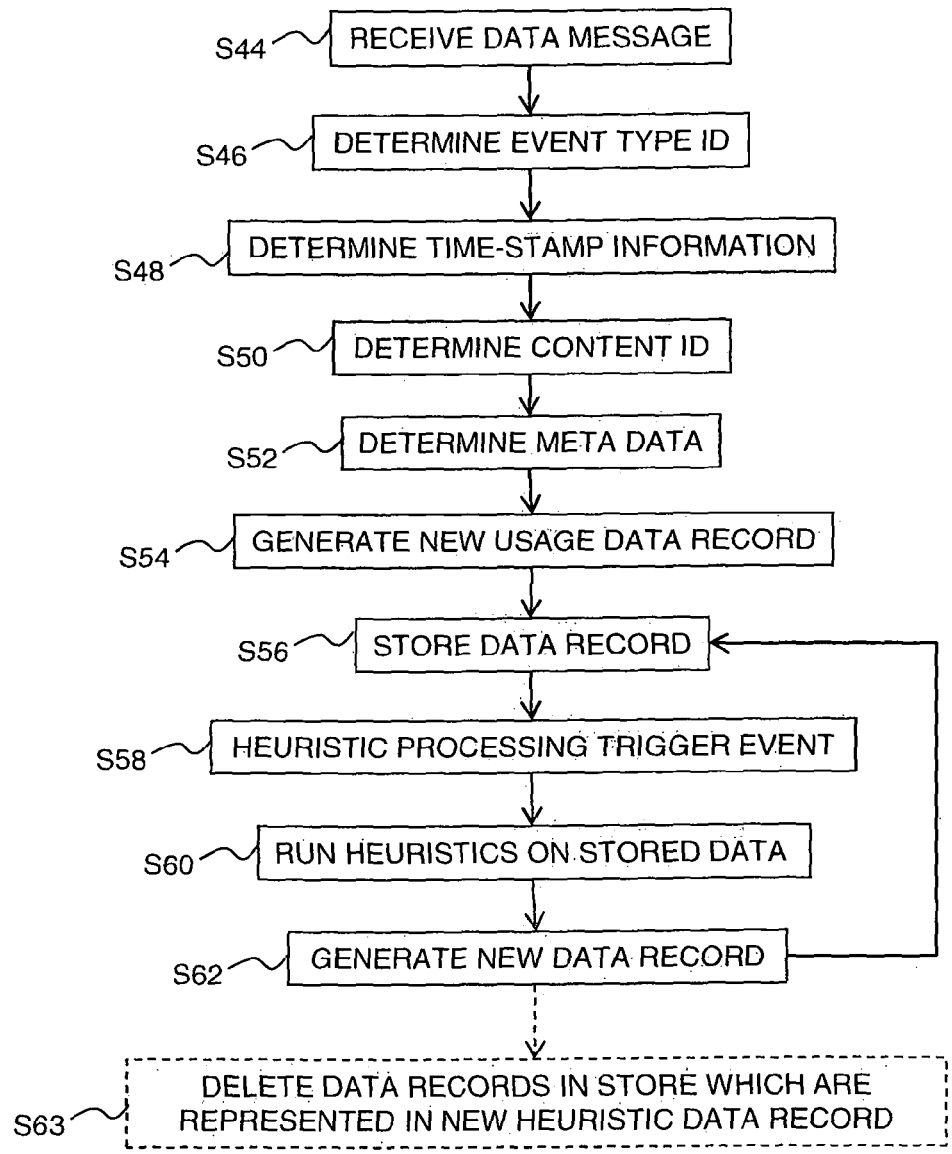
FIG. 6 shows in more detail how a usage recorder processes event data heuristically to provide user preference data according to an embodiment of the invention.

FIG. 6 shows in more detail an embodiment of a method of generating heuristic information on a client device 22 which shows schematically what steps are performed by the usage recorder 26 to generate heuristic data records from user interaction data records. As shown in FIG. 6, when usage recorder 26 receives a new user interaction data message (step S44), the data processor 28 processes it to either extract an event type identifier if one is provided or to analyse the type of event to assign it to an event type identifier (step S46). Similarly, time stamp information is determined either by extracting a time-stamp provided with the data message or by assigning a time-stamp (step S48). A content identifier is determined (step S50) again either by extracting it or by cross-referencing time-stamp information with the EPG. Metadata which is provided in the message such as the name of an actor in a related programme or the name of a person to whom a social recommendation has been sent, for example, is generated by processing the user interaction event data (step S52). This information is then used to populate the data fields of a usage or user interaction data record (step S54) which is then stored in data store 32 (step S56). Although shown in a particular sequence in FIG. 6, those of ordinary skill in the art will be aware that steps S46 to S52 may be executed in any appropriate sequence order or even in parallel in some instances.

Accordingly, in the embodiment shown in FIG. 6, in response to a predefined heuristic processing trigger event, for example, a request from the recommender input controller 16 for new input data or the elapsing of a recommendation cycle (step S58), heuristics operations, by which term is meant a so-called commonsense rule (or set of rules) which are intended to increase the quality or usefulness of the data records used for training the recommender, are run on the stored usage data records (step S60), and new heuristic data records are generated (S62), which are then stored (S56). Optionally, data records made redundant by the heuristic processing, such as may be the case if new heuristic data records are generated, are discarded (step S63).

One example of a heuristic operation in the context of an embodiment of the invention ranks a "watch channel" event highly as showing a user's preference for the associated content item being viewed. However, processing additional data records which indicated the channel was watched over a long period of time whilst the content item's audio was muted, results in a heuristic rule which re-ranks the watch-channel event data record as less likely to show a user preference or liking towards the silently viewed content. Accordingly, not all events of the same type may receive the same ranking, and rankings may be overwritten. Additional heuristics can, thus be run on previous data records which have been previously subject to heuristic processing. However, by categorizing user interaction data records not just by event type but also or instead by a user preference ranking which indicates if they might be useful for indicating a user preference towards the content item the data record relates to, it is possible to adjust how much data is sent in any one recommender cycle to re-train the recommender system 18 for that user. At the end of each recommender cycle, some or all of the data records held in data store 32 are uploaded to the recommender server 18, either directly or indirectly via the recommender input controller 16 by the client device. At this point, the unused data records held in data store 32 are normally deleted to clear more space to record data in the next recommender cycle.

Each recommendation cycle is modelled in one embodiment of the invention as a fixed interval, i.e., after a predetermined amount of time, all of the client devices 22 in communications system 10 which receive recommendations will provide the user interaction event data records to the service provider's service platform 14. Even if the data uploads are at staggered time intervals, the service provider is likely to still receive a large amount of data, particularly if the client devices 22 have not pre-processed the user interaction data to limit the data sent using heuristic processing to determine which records are likely to be more useful to the recommender system 18. Accordingly, in order to limit the amount of data provided to the recommender system 18, input control needs to be implemented according to the invention either on the client devices 22 or in the network.

Returning briefly now to FIG. 1, the service platform 14 is provided with data from client devices 22 and forwards this data to a network-based recommender input controller 16. The recommender input controller 16 shown in FIG. 1 provides three data processing functions. The first function determines the amount of data to input to the recommender, also referred to as training data U(t) which is shown as training data processor 16*a* in FIG. 1. The second function is to process the received usage data records in order to assess the performance of previous recommendations (e.g. did the user watch media items recommended in the recommendations?) which is shown as recommendation assessor 16*b*. The third function, shown as optional as it is alternatively provided entirely on each client device, comprises a heuristic data processing function shown as usage data processor 16*c* in FIG. 1. This function comprises processing user interaction data records to generate likeness records (heuristic data records which include an indication of user preference) and/or to heuristically rank each record in order of its likely usefulness in training the recommender system 18 (e.g. associated with the confidence that the degree of preference for a specified item is correct, and/or the usefulness in terms of how differentiated the preference is from an average user).

In one embodiment, a first level of heuristic processing is performed on each client device to provide likeness records indicating a determined degree of preference by a user for a particular content item and then a second level of heuristic processing is performed centrally by the recommender input controller to rank the likeness records in order of their usefulness to the recommender system 18 based on a combination of the degree of preference for a particular content item as determined by a respective client device 22 and the general popularity of the respective content item (possibly determined centrally in dependence upon other user's likeness records) (where generally likeness records associated with less popular content items are more useful for training a recommender system).

As mentioned above, the heuristic processing functionality can be placed in a number of different locations, most importantly either in individual client devices (e.g. as usage data processor 28 of FIG. 1) or in a central device within the network (e.g. the usage data processor 16c within the recommender input controller 16). The benefit of placing the functionality in client devices is that processing is distributed to the edge of the network to client devices which are likely to have spare processing power available for such activities and that the amount of data that needs to be transmitted from each client device can be reduced. On the other hand, it is possible to schedule uploads of data from the client devices in such a way that the load is thinly spread over time and the adverse impact on the network as a result of this process is relatively small; in such embodiments, a greater bottleneck may exist between a server platform which collects such data and then forwards it to the recommender system 18. In such a case performing the usage data processing at the service platform is as beneficial as performing it at the client devices (so long as it is performed somewhere before the bottleneck so as to minimise the amount of data that needs to flow through the bottleneck). Moreover it may be that a better assessment of the usefulness of data records to the recommender system 18 can be made centrally than at individual client devices (especially in terms of identifying generally popular items from more specialised items, etc.). Finally, it may be more efficient to implement as a centralized service where the hardware used to implement the functionality can be better tailored to the functionality to be performed and the software used to implement the functionality can be installed, administered, modified, updated etc at a single central location more easily and effectively than at a large number of distributed client devices.

Figure 7B:
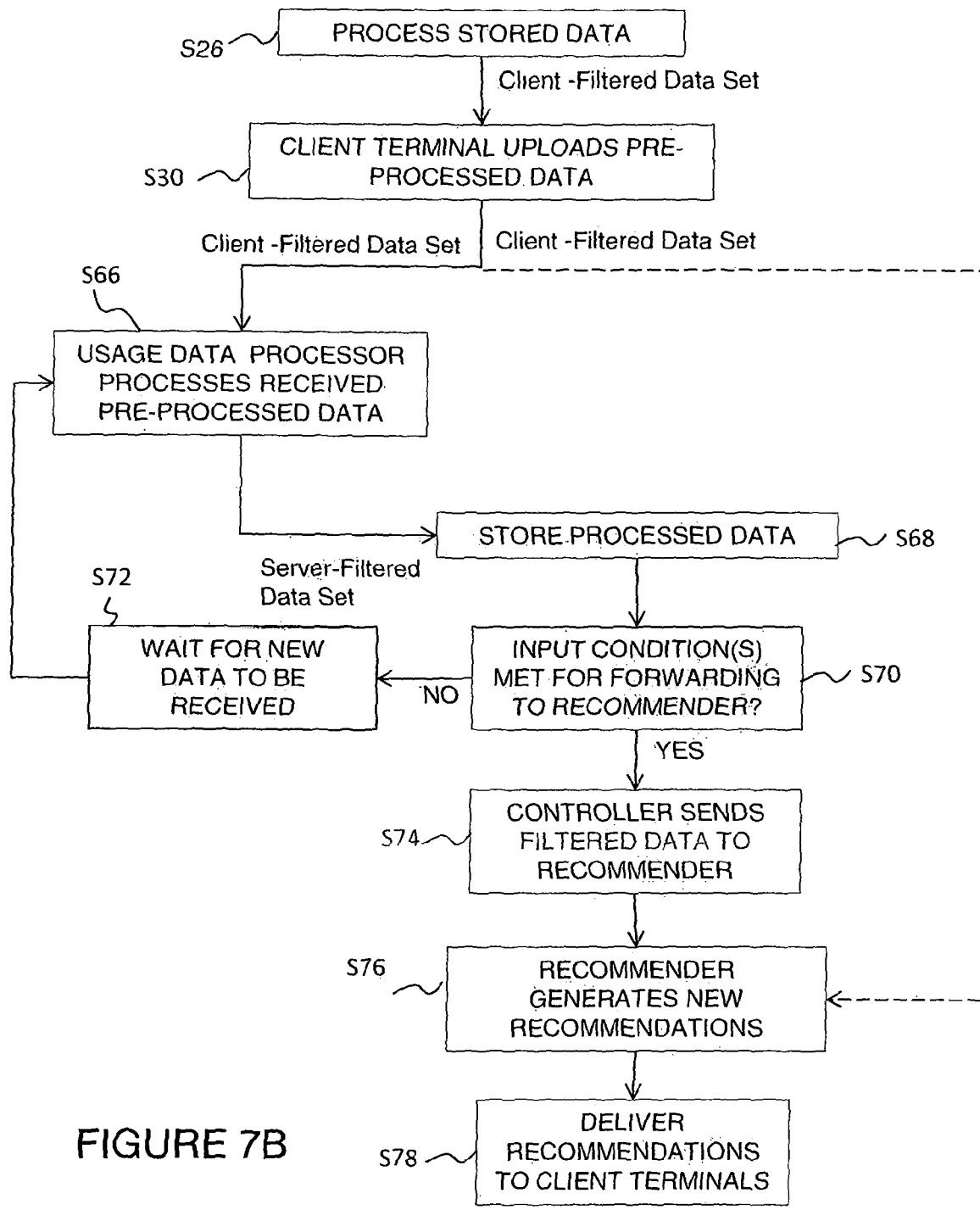

FIGS. 7A and 7B show schematically various ways of providing data from the usage recorder 26 to the recommender system 16, depending on whether some or all heuristic programming is performed in the network on the user interaction data records.

In FIG. 7A, the usage recorder 26 does not pre-process any data heuristically on the client device 22 to categorize user interactions with a ranking level according to how useful each user interaction record is likely to be in terms of indicating a user preference for the content item each record relates to. Therefore in the embodiment illustrated in FIG. 7A all of the filtering required by the embodiment to control the training data used by the recommender system is performed either by the recommender input controller or, as in a least preferred embodiment of the present invention, by the recommender system itself (this last least preferred arrangement being illustrated by the dashed line in FIG. 7A whereby all of the user interaction records are uploaded to recommender system 18 (usually this would be via service platform 14, but could alternatively be directly)). This naturally could create congestion at the recommender system 18 if all client devices 22 for which recommendations are being provided uploaded their user interaction records to the recommender system 18 at the same time. Furthermore, in this least preferred embodiment, no filtering takes place at the client device in terms of ranking the relevance of the records, or at the recommender input controller and so the entire set of user interaction data records are uploaded to recommender system 18 regardless of their relevance and therefore rather than reducing the burden on the recommender system 18 it is increased.

Therefore, according to the more preferred embodiment illustrated in FIG. 7A (ignoring the dashed line), where user records are not ranked or filtered at the client device 22 (and thus corresponds to an embodiment in which a client device does not contain a usage data processor 28 as illustrated in FIG. 1 but the recommender input controller 16 includes a usage data processor 16c), to control how much training data is passed to the recommender system 18, client devices 22 send their user interaction data records (step S30) to the recommender system 22 via the recommender input controller 16 (also via service platform 14, not shown) which pre-processes this data to generate training records which are then sent on to the recommender for training purposes. The usage data processor 16c function of the recommender input controller 16 processes the received user interaction data records (step S66) by running a heuristic algorithm to determine the likely relevance of each data record as an indication of a user preference for a content item to which it relates (or to which a relationship can be inferred from the data somehow) and then assigns each such record a ranking to indicate a determined usefulness to the recommender system 18 for training purposes. For each client device 22, the data records are then ranked and stored in an appropriate data store (step S68).

In the more preferred embodiment shown in FIG. 7A, the recommender input controller 16 sends a batch of data records for all of the client devices 22 in communications system 10 which receive recommendations for the service offered by the service provider. Accordingly, until some batch forwarding condition is met (step S70), the input controller waits until more records are received (step S72). At this point, the amount of data for each client device is individually filtered before being forwarded to recommender system 18 (step S74) according to their likely relevance in adjusting the recommender system's performance. Accordingly, a ranking condition for forwarding, for example, a minimum ranking level, is imposed on all of the user interaction data records by the input controller to ensure that only data records which have been assigned a category and/or ranking in terms of their relevance above a dynamically adjustable level are forwarded to the recommender system 18. This ranking condition for forwarding, however, is capable of being individually determined for each individual user interaction data record set, i.e., for each user, which enables a varying amount of the data to be provided to the recommender system 18 to retrain its performance for the respective user.

In this way, each training data set U(t) for a user is adjustable according to the amount and types of recorded user activity. In each recommender cycle i, each respective client device 26 uploads its heuristically un-ranked (although possibly pre-processed in some way) user interaction event records generated in that cycle (step S30) via service platform 14 to the recommender input controller 1'6. The recommender input controller 16 processes the received data (S80) in the current recommender cycle i to assign a ranking and then filters the amount of ranked usage data it provides as a training data set U(ti) to the recommender system 18.

The ranked usage data is individually filtered by the recommender input controller 16 for each respective client device 22, so that the ranked usage data provided in recommender cycle i is likely to result in a set of recommendations for the next recommendation cycle i+1 whose performance y(t) more closely approximates a desired reference level of recommendation performance $y_{REF}$. Once the input conditions for forwarding data for recommender cycle i to the recommender system 18 are met, a batch of stored data sets U(t$_i$)s is forwarded to the recommender system 18 (step S74). The recommender then generates new recommendations for the next recommender cycle i+1 (step S76). The recommendations are then delivered to the client devices 22 (step S78).

The way the recommender input controller determines the filtering conditions for ranked user interaction records is described in more detail herein below with reference to FIGS. 8 to 10 of the accompanying drawings.

Note that even in the least preferred embodiment illustrated by the dashed line in FIG. 7A, the step S80 of processing the received data still needs to be performed, only it is performed by the recommender system 18 itself rather than the recommender input controller and clearly in such a case there is no need to send the processed data to the recommender system since it is doing the preprocessing (and so steps S70, S72 and S74 at least become redundant).

Turning now to FIG. 7B of the accompanying drawings, two embodiments of the invention are Shown schematically in both of which the data which is (ultimately) input to the recommender system 18 comprises data which has been pre-processed and potentially assigned a relevance ranking by usage recorder 26. In one of these embodiments the data is sent directly to the recommender system 18 whereas in the other it goes via the recommender input controller 16 which first, performs some additional processing on the pre-processed data before forwarding the data (derived originally from the client devices 22) to the recommender system 18.

In FIG. 7B, the usage recorder 26 processes stored user interaction event records to generate heuristic data records likeness records (in step S26) which are capable of then being filtered on the client device before being forwarded to recommender system 18. In the embodiment shown by the dashed line in FIG. 7B, each client device 22 directly forwards data to the recommender system 18 by adhering to, for example, an appropriate upload schedule. Alternatively, uploads can be coordinated by service platform 14. The recommender system 18 thus receives only pre-processed usage data which has been filtered directly by each client device 26. As such, each client device 26 may use a fixed predetermined filtering ranking level (e.g. send all events ranked 5 or above on a scale from 0 to 10 no matter how many), a relative ranking level (e.g. only send the categories of events which provide the top 50% of all events, no matter what their individual ranking), or a training data control function can be run on the client device 26 similar to the training data control function 16b shown in FIG. 1 as run in the network, providing performance data y$_{REF}$ and y(t) is made available to each client device 26.

Accordingly, in the embodiment represented by the dashed line between steps S30 and S76 in FIG. 7B, the set of training data records U(t) comprises data generated by heuristically pre-processing usage events so that a reduced data set is provided to the recommender system 18 from the client device 22. This client-filtered data is then used by the recommender system 18 to generate new recommendations (step S76) for each client device 22 which are then suitably delivered to the respective client device (step S78).

Also shown in FIG. 7B of the drawings is an embodiment of a method of providing input to a recommender system according to the invention in which the usage recorder 26 pre-processes data (S26) and uploads the data (S30) to the recommender input controller 16 (step S80). The pre-processing may include a filtering step; for example, the same filtering according to rank as described hereinabove, however, in addition the recommender input controller also processes the data records received from each client device 26 to determine what sub-set of the received, pre-processed data is to be sent to the recommender system 18. Accordingly, in this instance, the recommender input controller functions in a similar way as was described in FIG. 7A, except on a smaller data set to start with and without the need to determine an indicator of the user preference for a particular content item.

Once the recommender input controller 16 has determined the optimum data set U(t) to provide to the recommender system 18 for each client device 26, it will store the result (step S68) and determine whether it is appropriate to provide input to the recommender system 18 (step S70). If it is not appropriate, for example, if one or more upload conditions need to be complied with but have not been so far, the controller 18 will wait for more data to be received (step S72). Normally the additional data will be from other client devices (not shown) as although it is possible for client device 26 to provide repeated uploads to the controller 16 within a recommendation cycle, this would mean that the pre-processed data would be unlikely to be optimally reduced data by the heuristic processing the usage recorder 26 performs.

Accordingly, in each recommendation cycle i, once the (or all) forwarding condition(s) has(have) have been met, recommender controller 16 forwards a global set of individual U(t$_i$)s to the recommendation system 18 (step S74). The global set of U(t$_i$)s comprises all the individual U(t$_i$) the controller 16 has determined for each respective client device 26 which has provided data in the respective recommendation cycle i. Examples of upload condition(s) which must be met for the controller 16 to provide input to the recommender system 18 (step 70), include for example: if all client devices have provided data in a given recommendation cycle i; if all recommender cycles have a predetermined duration, once a given amount of time has elapsed; or if the recommender system 18 has requested input. At this point the recommender system 18 generates new recommendations (step S76), and the recommendations are appropriately delivered to the client devices 26 (step S78).

Figure 8:
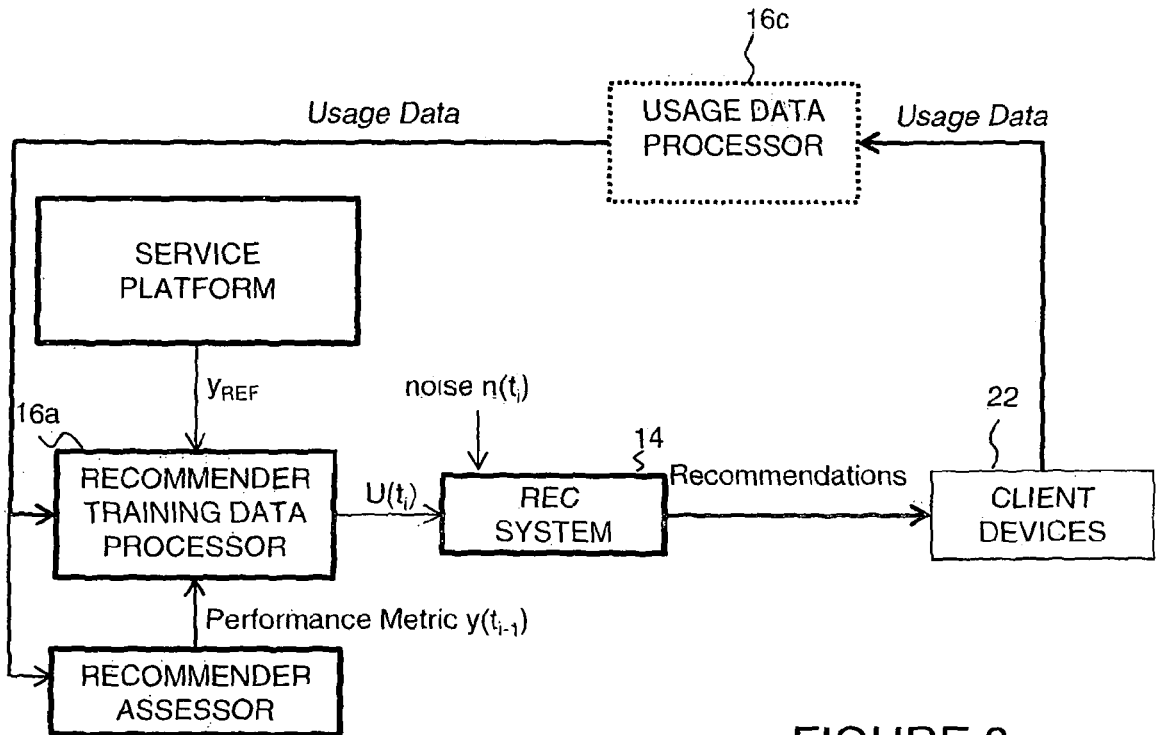
FIG. 8 shows schematically the feedback loop which determines how a recommender input controller generates training data U(t) according to an embodiment of the invention.

The amount of data which is provided in each recommendation cycle is, in one embodiment of the invention, provided by a performance feedback loop in which the controller 16 participates and is shown schematically in FIG. 8 of the accompanying drawings.

The feedback loop shown in FIG. 8 shows the recommender training data input controller or processing Junction 16a receiving y$_{REF}$ from service platform 14. The recommender input controller 16 then processes this with a performance metric y(t) measured, in the present embodiment, by the recommendation assessor function 16b, and uses this to determine the amount of data needed to drive y(t) towards y$_{REF}$. This enables the recommender system 18 to generally address the fact that users continue to rate items over time by iteratively re-training its preference models. Recommender system 18 is configured to request and/or receive regular iterative training data updates u(t) to improve the recommendations it provides to users. An on-line learning algorithm is provided in the recommender system 18 which seeks to learn what are the most preferred type of content items for individual users based on the training data updates u(t) provided to it by the recommender input controller 16. The recommender input controller 16 seeks to adapt the type and amount of usage data provided as training data to the recommender system 18 for each individual client device 22 to provide the minimum amount of data to drive the recommender system 18 towards the predetermined level of recommendation performance $y_{REF}$ for each client device 22.

In one embodiment, $y_{REF}$ is fixed for all client devices/service subscribers at the same level by the service provider or other party and the recommender input controller 16 is then used to control the operation of the recommender system 18 towards this desired global level of performance. Note though that in alternative embodiments several different values of $y_{REF}$ could be used for different groups of users (or in the extreme on an individual user by user basis). In other words, a provider may choose to segment their client population into groups with different performance targets.

The configuration of the recommender input controller 16 will now be described with reference to FIG. 9 of the accompanying drawings. Here the performance of the recommender system 18 is denoted as y(t), where t represents the time domain, and y(t) the performance at a given time. Performance is observed directly by monitoring the uploaded data from the client devices and is determined by recommender assessor 16b.

The amount of data uploaded to the recommender system 18, either by the recommender input controller 16 located in the network or by the client device 22 (in an alternative embodiment in which similar functionality to that of the recommender input controller 16 is provided directly on each client device), is denoted u(t). Effectively, u(t) indicates the number of new training samples which are used to adjust the performance of the recommender system 18. Analysis of the system dynamics reveals that the rate of change of performance y'(t) is proportional to the number of new training samples u(t) entering the system, where each client device 26 generates usage data from which u(t) is derived. Assuming the number of new training samples is proportional to current performance y(t) of the recommender system 18, one can deduce a certain number of new training samples is necessary to maintain the performance of the recommender system 18. Accordingly, the dynamic performance of the recommender system 18 can be modelled as:

$$ry'(t) + ky(t) \approx u(t) \quad \text{Eqn. 1}$$

where y'(t) is the time derivative of the system performance y(t), as mentioned above. r and k are parameters which may be estimated from system performance. Note that this can be considered as being analogous to a mechanical system in which a block is connected to a fixed wall by a spring and a dampener (whose dampening force is negatively proportional to the velocity of the block (towards or away from the wall). In the analogy, k is equivalent to the Hooke's constant of the spring, y(t) is equivalent to the displacement or the extension of the spring and r is equivalent to the dampening factor of the dampener. A steady force away from the wall will result in the block (eventually) adopting a fixed position at a distance (e.g. distance d) away from the wall at which the back-pulling force of the spring exactly balances the outward force being applied to the block.

Estimations of r and k may be obtained by rewriting the above differential equation in discrete form as:

$$y(t) = \frac{r}{r + \Delta t k} y(t-1) + \frac{\Delta t}{r + \Delta t k} u(t) + \varepsilon(t) \quad \text{Eqn. 2}$$

where $\Delta t$ denotes the unit of time interval and $\varepsilon(t)$ denotes the uncertainty in the system. Over a time period $t \in [0,T]$, the performance in matrix notation can be expressed as $$y = Y'\theta + \varepsilon \quad \text{Eqn. 3}$$

where $y = (y(1), \ldots, y(t), \ldots, y(T))'$, and $$\theta = \left(\frac{r}{r + k\Delta t}, \frac{\Delta t}{r + k\Delta t}\right)', \text{ and}$$

$$Y = \begin{pmatrix} y(0) & \ldots & y(t-1) & \ldots & y(T-1) \\ u(1) & \ldots & u(t) & \ldots & u(T) \end{pmatrix}.$$

(Note indicates taking the transpose of a matrix—i.e. Y' means the transpose of Y)

Using Maximum Likelihood (ML) estimation from the observation over this time period $t \in [0,T]$, and assuming that the error $\varepsilon$ has a multivariate normal distribution with each random variable being independent of one another and having a mean of 0 and a variance of $\sigma^2$ such that the covariance matrix $\Sigma$ collapses to a variance matrix which can be expressed as $\sigma^2 I$ where I is the identity matrix of rank T (i.e. for I each element on the diagonal is one and every other element is zero—or equivalently the variance matrix has each element on the diagonal equal to $\sigma^2$ and every other element is zero). Since $|I|=1$, $|\sigma^2 I|=\sigma^{2T}$ and $I^{-1}=I$ and $(\sigma^2 I)^{-1}=\sigma^{-2} I$, the log-likelihood function of the parameters may be expressed as $$L(\theta, \sigma^2 | Y) = \ln\left(\frac{\sigma^{-T}}{(2\pi)^{T/2}} e^{-\frac{(y - Y'\theta)'(y - Y'\theta)}{2\sigma^2}}\right) \quad \text{Eqn. 4}$$

This is then differentiated with respect to $\theta$ to find the ML estimates of the parameter $\theta$ and hence k and r assuming $\Delta t = 1$ (that is data is sampled once per day (i.e., assuming each recommender cycle has a time interval of one day)), thus:

$$\left(\frac{\hat{r}}{\hat{r} + \hat{k}}, \frac{1}{\hat{r} + \hat{k}}\right)' = \text{argmax}_\theta (L\theta, \delta^2 | Y) = (YY')^{-1} Y y \quad \text{Eqn. 5}$$

u(t) is then chosen to increase the accuracy and robustness of the estimation provided. Disturbance is modelled by using a log-normal random walk model (as described for example in Bacry, E., Delour, J., and Muzy, J., "Multifractal random walk" in Physical Review E 2001) to estimate the mean ($\mu$) and standard deviation ($\sigma$) from the input data and simulate a time-series that has the same mean and variance. By defining the u(t) as the time series of the input values over a predefined time period [0,T], the modified input u(t) becomes $du(t) = \mu u(t) dt + \sigma u(t) dW(t)$ where W(t) is the Wiener process $dW(t) = \varepsilon \sqrt{dt}$ and $\varepsilon$ is the noise N(0,1). This approach randomizes the time series depending on the standard deviation of the intended input. By setting $\sigma$ to zero, the exponential curve obtained can be used to represent data growth.

u(t) is optimised by the recommender input controller 16 so that the performance of the recommender is as stable as possible. In other words, if the performance deteriorates from the desired value, the input u(t) needs to change quickly to bring y(t) back to the desired value. Accordingly, the performance y(t) generated in the previous recommendation cycle is fed back to the controller and compared with the desired reference value $y_{REF}$. Alternatively, the resulting error signal $e(t) = y_{REF} - y(t)$ is calculated by the recommendation assessor 16b in the recommender input controller 16

(in embodiments such as the present one in which this measures the performance y(t) and has visibility of the desired $y_{REF}$), in which case it is possible to just provide e(t) to the training data processor 16a.

When the training data processor 16a receives the feedback signal (y(t) or e(t)), it calculates how much it needs to modify the amount of u(t) provided in that cycle, and based on this and its knowledge of the amount of data which has been assigned to each ranking level, filters the amount of data forwarded to the recommender system 18. In this way, the feedback on how the recommender system 18 has performed in the previous cycle based on usage data received from the client devices enables the recommender input controller 16 to dynamically compensate for changes in user activity levels etc, and produce for each individual client device training data which should result in the recommender performance being driven towards the desired performance level $Y_{REF}$.

As mentioned above, this feedback loop is shown schematically in FIG. 8. In FIG. 8, the reference recommendation performance metric $y_{REF}$ is used to control the input provided by the recommender input controller 16 to the recommender system 18 so that the performance of the recommender system 18 stabilizes ideally around $y_{REF}$ for each client device 22. If $y_{REF}$ is fixed for all client devices receiving service recommendations for the service, provided by a service provider, the amount of training data provided from each client device differs to ensure that the recommender performance in the next cycle is likely to be the same for all client devices. Accordingly, in any given recommender cycle i, when the recommender input controller 16 receives input from one or more client devices 22, it determines how to filter the data using a feedback performance metric $y(t_{i-1})$ which the recommendation assessor 16b has provided based on its determination of the performance of the previous i−1 recommender cycle's recommendations. Using this information, the training data processor 16a determines an error value $e(t_{i-1})=y_{REF}-y(t_{i-1})$. This is then used to adjust how many training data records $u(t_i)$ are to-be provided to the recommender system 18 for use by the recommender system 18 in the next recommender cycle i+1.

Various different closed loop control algorithms could of course be used to determine the amount of new training data that should be sent to the recommender system 18 for each device based on an assessment of the performance of prior recommendations for that device. However, in the present embodiment, a type of PID (Proportional, Integral, Differential) controller is used with values set for the three control variables (referred to below as C, B and D for the proportional, integral and differential control variables respectively). The present invention is not limited to any particular way of setting the values of such control variables, but in the example of the present embodiment in which the recommender system 18 is modelled in the manner described above, a simulation of the recommender system was used to help choose reasonable starting values for C, B and D which by design were considered to provide stable behaviour and then the values where tweaked to optimise the design in terms of the behaviour of the system. The present inventors found in particular that a zero value for the differential control variable D provided good results. This can be achieved by using the control algorithm to obtain as the Manipulated Variable a difference from the previous value of u(t) (i.e. $u(t_i)-u(t_{i-1})$) instead of manipulating $u(t_i)$ directly, and then setting the B variable to zero (since obtaining a difference in u(t) as the manipulated variable is approximately equivalent to identifying the change in the manipulated variable and thus the differential component (scaled by D) becomes approximately equivalent to a proportional component and the proportional component (scaled by C) becomes approximately equivalent to the integral component, while the integral component (scaled by B) becomes approximately equivalent to a double integrated component which can be safety disposed of). Generally having no differential component in a PID controller (and therefore being effectively a PI controller) helps to keep the system operating relatively stably even within a noisy environment, which is clearly appropriate in the present case where there is a large amount of noise in the measured error value (termed the Process Variable in standard PID controller theory).

Figure 9:
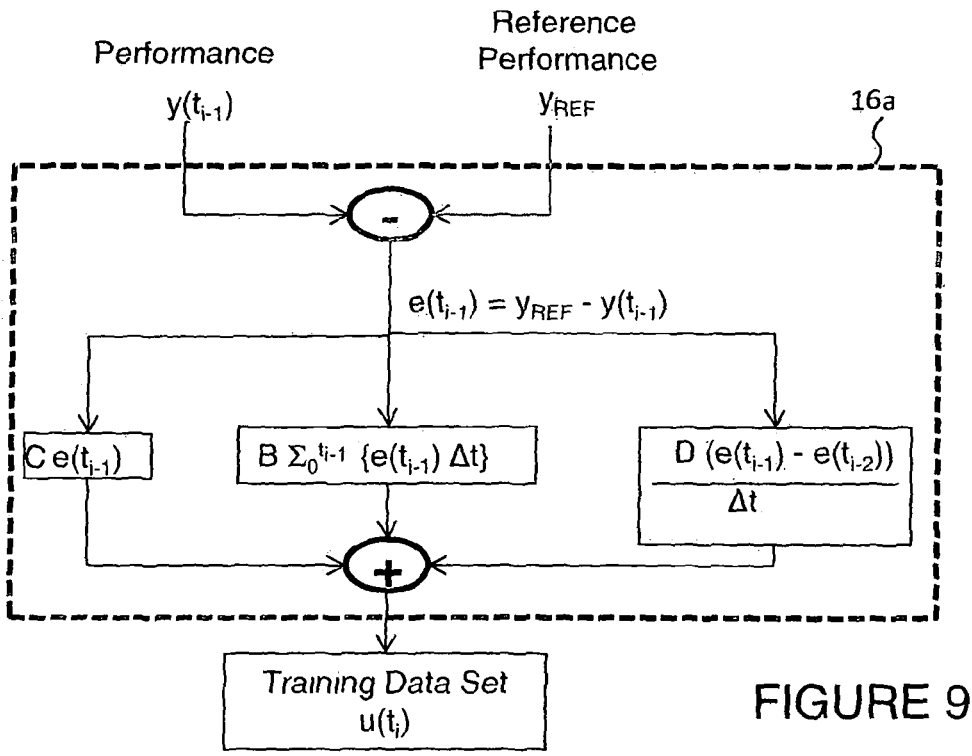
FIG. 9 shows in more detail the internal configuration of the recommender input controller according to an embodiment of the invention.

FIG. 9 shows how the number of training sampled $u(t_i)$ is calculated according to the present embodiment of the invention discussed above in which the input controller 16 is configured as a PID closed loop controller (with values for the control variables C, B and D preferably chosen using a model of a damped harmonic oscillator to model the recommender system 18 as described above). As previously mentioned, in a current recommendation cycle i, controller 16 receives a performance measurement (the Process Variable) from the previous recommendation cycle i−1, which is used to determine a training data set $u(t_i)$ which in turn is taken into account by the recommender system 18 in time for the next recommendation, cycle i+1. As shown in FIG. 9, the controller compares the received performance data metric $y(t_{i-1})$ for the previous cycle i−1 against a reference performance metric $y_{REF}$ to determine an error metric $e(t_{i-1})$ for that cycle i−1. Then, the controller 18 sums the error metric $e(t_{i-1})$ scaled by the control variable C with the sum over all previous cycles of the product of the error metric e(t) and the duration between samples Δt, scaled by another control variable B with the difference between the error $e(t_{i-1})$ and the previous cycle's error $e(t_{i-2})$ multiplied by another control variable D divided by the time between cycles Δt ($\Delta t=(t_i-t_{i-1})=(t_{i-1}-t_{i-2})$ . . . etc.), as shown below, in Equation (6):

$$u(t_1) = Ce(t_{i-1}) + B\sum_{t=0}^{t=t_{i-1}} e(t)\Delta t + D\frac{e(t'_{i-1}) - e(t_{i-2})}{\Delta t} \qquad \text{Eqn. 6}$$

Accordingly, controller 16 functions as a proportional integral derivative (PID) controller in which for each future cycle i, the first term comprises the proportional gain linear relationship between the error $e(t_{i-1})$ of the preceding cycle and the next cycle input $u(t_i)$, the second term describes the relationship between the integral of the error $e(t_{i-1})$ and the next cycle input $u(t_i)$ and the final term describes the relationship between the rate of change (the time derivative) of the error $e(t_{i-1})$ from the previous cycle i−2 and the next cycle's input $u(t_i)$. Assuming uniform sampling, Δt=1, the above equation which approximates the differential equation for a damped harmonic oscillator can be rewritten as:

$$u(t_i) = Ce(t_{i-1}) + B\sum_{t=0}^{t=t_{i-1}} e(t) + D(e(t_{i-1}) - e(t_{i-2})) \qquad \text{Eqn 7}$$

Figure 10:
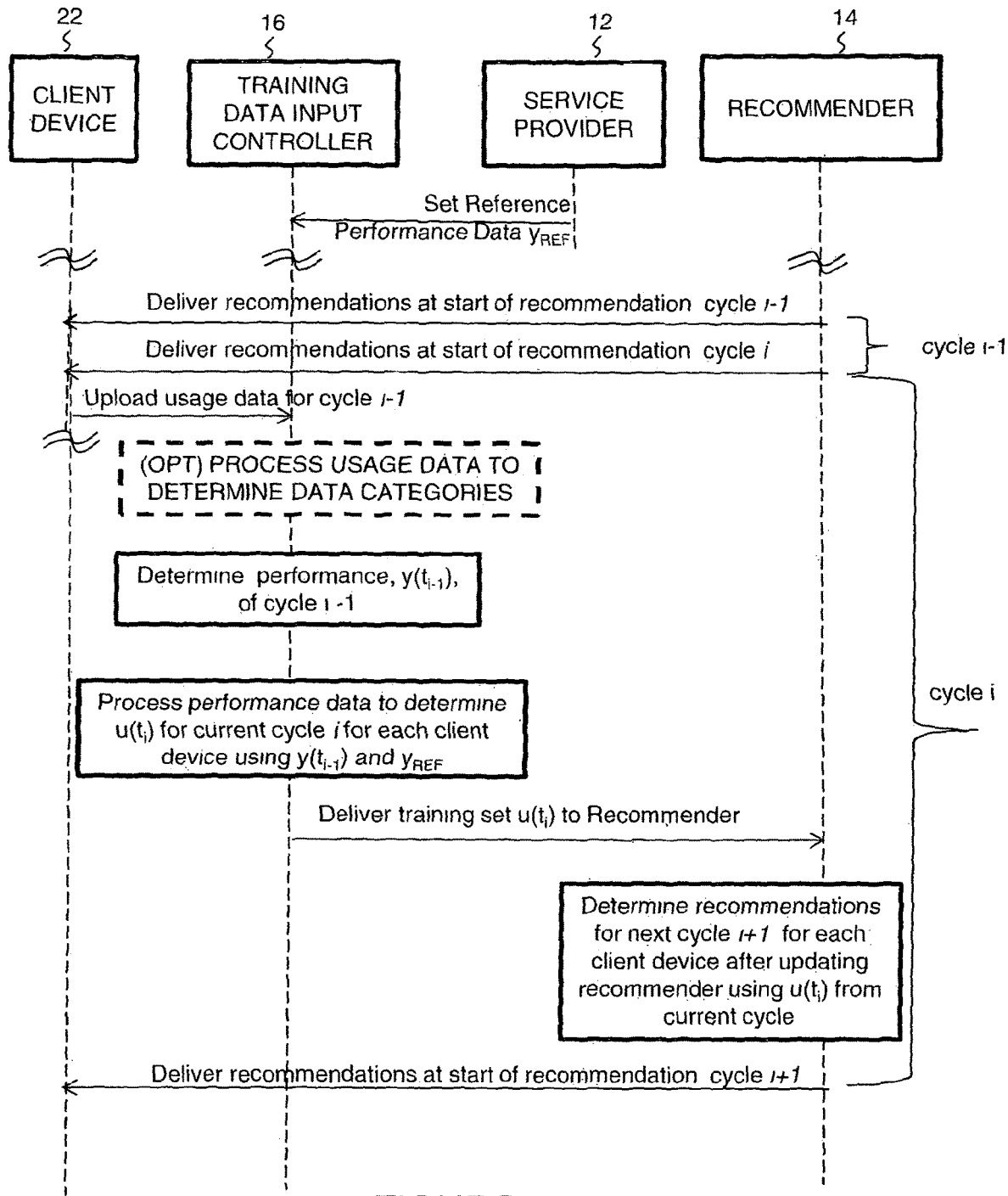
FIG. 10 shows schematically how training data is provided according to an embodiment of the invention using recommendation performance feedback from a recommender input controller.

FIG. 10 shows sequentially the data flows which occur between the system components shown in FIG. 1. It shows two entire recommender cycles (cycles i−1 and i) but begins with showing the service provider setting the desired performance level $y_{REF}$. Some time after setting $y_{REF}$, recommendations for cycle i−1 are sent by the recommender to a client device. Note that the desired performance level, $y_{REF}$, is usually set for a number of recommender cycles. At the start of cycle i−1, recommendations are sent to each client device 22. At the end of cycle i−1 a new set of recommendations associated with cycle i are sent and after this the client device responds by uploading usage data associated with the preceding set of recommendations (cycle i−1) to the recommender input controller 16. As mentioned hereinabove, optionally the usage data processor 16c of the recommender input controller 16 will assign relevance rankings at this point which may supplement or be instead of relevance rankings assigned by the client devices to all user records forwarded. The recommendation assessor 16b of the recommender input controller 16 then processes the usage data for the previous cycle (possibly after some further processing of the data by the usage data processor 16c) to obtain a performance value $y(t_{i-1})$, and then the training data processor 16a compares $y(t_{i-1})$ to the reference value $y_{REF}$, and determines the number of training data records, $u(t_i)$, to send to the recommender system 18 (note though that u(t) will in fact be formed from usage data (after suitable processing) associated with the preceding cycle i−1 and not with the usage data obtained as a result of user usage performed during cycle i). Depending on the value of $u(t_i)$, the most highly ranked training data records are then sent. This may be performed by listing all user interaction events according to ranking and applying a cut-off ranking below which the user interaction data records of the low ranking events are discarded or simply by selecting the n highest ranked records, etc. The filtered (and otherwise processed) usage data, $u(t_i)$, for each client device is then sent to the recommender system 18 (either directly or via service platform 14), enabling the recommender system 18 to generate the next set of recommendations and to determine the necessary adjustments required to drive its performance towards the desired $y_{REF}$ level.

In this way, the recommender input controller balances the performance of recommendation system 18 for all customers against the amount of user behaviour data collected from customers on an individual basis. In a content delivery service scenario, the invention enables a large subset of customers to be targeted with personalized recommendations even if they only watch broadcast TV.

Whilst the above embodiments have been described primarily in terms of content items, those of ordinary skill in the art will realise that the recommender control system can be provided in any context where recommendations are provided for consumable items, and as such the above description is not limited to any content item such as multi-media data comprising video, audio or text but extends to controlling any recommender performance for any recommendable consumable product/service. As such the scope of items for which recommendations are provided, and recommender input control provided in accordance with the invention, is not limited, for example, to films, music (video and audio), and books but also applies to any item for sale as well as services (for example, trading outfits etc). Such services for which recommendations are generated may comprise a service selling items for delivery to the user or a service advertising the services of other parties.

What is claimed is:

1. A method of providing recommendations to a client device, the method comprising:

a recommender system delivering a first set of recommendations to the client device in a first recommendation cycle;

the recommender system delivering a second set of recommendations to the client device in a second recommendation cycle;

generating and storing usage data determined by the client device as potentially useful, and ranking the usage data into at least two different categories of potential usefulness in deriving user preference information, the ranked potentially useful usage data stored on the client device being usage data generated in response to user actions performed on or with the client device, and the ranking of the usage data into the at least two different categories of potential usefulness in deriving the user preference information by the client device including performing a heuristic processing on the usage data;

the client device transmitting a first set of usage data to the recommender system, the first set of usage data being associated with the first set of recommendations;

calculating a performance value of the first set of recommendations based on the first set of usage data and comparing the performance value to a performance reference value;

responding at the client device to a trigger for providing a second set of usage data ranked in a first category of potential usefulness so that the provided second set of usage data is limited to only usage data ranked in the first category of potential usefulness, the second set of usage data ranked in the first category of potential usefulness relating to at least two user actions performed on or with the client device, at least one of the user actions including user storing or viewing of a content item such that the second set of usage data ranked in the first category of potential usefulness includes an explicit indication of user preference inferred from the heuristic processing on the usage data relating to the at least one of the user actions including the user storing or viewing of the content item;

selecting at the client device an amount of the usage data for the second set of usage data, wherein the selected usage data is ranked in the first category of potential usefulness and is dependent upon the trigger, or having been specified by the recommender system, and is further dependent on the comparison of the calculated performance value of the first set of recommendations to the performance reference value;

transmitting the selected second set of usage data to the recommender system for use by the recommender system;

generating a third set of recommendations based on the transmitted second set of usage data; and transmitting the third set of recommendations to the client device.

2. A method according to claim 1 wherein selecting the usage data for the second set of usage data comprises selecting a subset comprising some but not all of the stored usage data.

3. A method according to claim 1 wherein the trigger is the receipt of a request from the recommender system for the second set of usage data and wherein the selection of usage data for the second set of usage data for transmission is made in dependence upon criteria specified in the request.

4. A method according to claim 1 wherein ranking of the usage data is based on a ranking system which aims to rank the usage data in order of its usefulness for indicating the preference of one or more media items consumed by a user of the client device, and wherein the selected usage data depends upon the ranking of the usage data.

5. A method according to claim 1, wherein the usage data is pre-processed to form a set of preference records each of which identifies a media item, and includes an indication of a user preference for that media item.

6. A method according to claim 5 wherein each preference record further includes an indication of whether a liking or a disliking for the media item identified in the record has been inferred from the associated usage data by the pre-processing of that usage data.

7. A method according to claim 6 wherein the preference record further includes an indication of the associated usage data from which a liking indication has been inferred.

8. A non-transitory carrier medium carrying processor implementable instructions for causing the method of claim 1 to be carried out during execution of the processor implementable instructions.

9. The method of claim 1, wherein another of the at least two user actions performed on or with the client device includes a direct user rating of a content item.

10. A recommendation arrangement comprising a recommender system and a plurality of client devices,
wherein each client device comprises:
a receiver for receiving a first, second and third set of recommendations from the recommender system;
a usage logger for generating, storing and ranking usage data into at least two different categories of potential usefulness in deriving user preference information, the ranked potentially useful usage data stored on the client device being usage data generated in response to user actions performed on or with the client device, and the ranking of the usage data into the at least two different categories of potential usefulness in deriving the user preference information by the client device including performing a heuristic processing on the usage data;
a transmitter for transmitting a first set of usage data to the recommender system, the first set of usage data being associated with the first set of recommendations;
a processor configured to calculate a performance value of the first set of recommendations and compare the calculated performance value to a performance reference value;
a responder for responding to a trigger for providing a second set of usage data to the recommender system, the second set of usage data ranked in a first category of potential usefulness so that the provided usage data is limited to only usage data ranked in the first category of potential usefulness, the usage data ranked in the first category of potential usefulness relating to at least two user actions performed on or with the client device, at least one of the user actions including user storing or viewing of a content item such that the usage data ranked in the first category of potential usefulness includes an explicit indication of user preference inferred from the heuristic processing on the usage data relating to the at least one of the user actions including the user storing or viewing of the content item; and
a selector for selecting an amount of the usage data for the second set of usage data, wherein the second set of usage data is ranked in the first category of potential usefulness and is dependent upon the trigger, or having been specified by the recommender system, and is further dependent on the comparison of the calculated performance value of the first set of recommendations to the performance reference value;
wherein the transmitter is also for transmitting the selected second set of usage data to the recommender system; and
wherein the recommender system comprises:
a recommendation generator for generating the first set of recommendations, the second set of recommendations, and the third set of recommendations, wherein the third set of recommendations are based on the transmitted second set of usage data; and
a transmitter for transmitting the first, second and third sets of recommendations to the client devices.

11. A recommendation arrangement according to claim 10, wherein the responder for responding to a trigger comprises a receiver for receiving a request, from the recommender system, for the second set of usage data and wherein the selection of the second set of usage data for transmission is made in dependence upon criteria specified in the request.

12. A client device comprising:
a receiver for receiving a first, second and third set of recommendations from a recommender system;
a usage logger for generating, storing usage data, and for ranking the usage data into at least two different categories of potential usefulness in deriving user preference information, the ranked potentially useful usage data stored on the client device being usage data generated in response to user actions performed on or with the client device, and the ranking of the usage data into the at least two different categories of potential usefulness in deriving the user preference information by the client device including performing a heuristic processing on the usage data;
a transmitter for transmitting a first set of usage data to the recommender system, the first set of usage data being associated with the first set of recommendations;
a processor configured to calculate a performance value of the first set of recommendations and compare the performance value to a performance reference value;
a responder for responding to a trigger for providing a second set of usage data, the second set of usage data ranked in a first category of potential usefulness so that the provided usage data is limited to only usage data ranked in the first category of potential usefulness, the usage data ranked in the first category of potential usefulness relating to at least two user actions performed on or with the client device, at least one of the user actions including user storing or viewing of a content item such that the usage data ranked in the first category of potential usefulness includes an explicit indication of user preference inferred from the heuristic processing on the usage data relating to the at least one of the user actions including the user storing or viewing of the content item; and
a selector for selecting an amount of the usage data for the second set of usage data, wherein the second set of usage data is ranked in the first category of potential usefulness and is dependent upon the trigger, or having been specified by the recommender system, and is further dependent on the comparison of the calculated performance value of the first set of recommendations to the performance reference value;
wherein the transmitter is also for transmitting the selected second set of usage data to the recommender system.

13. The recommendation arrangement according to claim 10, wherein another of the at least two user actions performed on or with the client device includes a direct user rating of a content item.

14. A client device according to claim 12 wherein the responder for responding to the trigger comprises a receiver for receiving a request, from the recommender system, for the second set of usage data and wherein the selection of the second set of usage data for transmission is made in dependence upon criteria specified in the request message specifying a request amount of usage data.

15. A client device according to claim 12 wherein the usage logger is operable to rank the usage data based on a ranking system which aims to rank the usage data in order of its usefulness for indicating the preference of one or more media items consumed by a user of the client device.

16. A client device according to claim 12 further comprising a usage data pre-processor for pre-processing the usage data to form a set of preference records each of which identifies the item, and includes the indication of a user preference for that item.

17. The client device according to claim 12 wherein another of the at least two user actions performed on or with the client device includes a direct user rating of a content item.

* * * * *